(12) United States Patent
Matsubara et al.

(10) Patent No.: US 6,395,250 B2
(45) Date of Patent: May 28, 2002

(54) LITHIUM/NICKEL/COBALT COMPOSITE OXIDE, PROCESS FOR PREPARING THE SAME, AND CATHODE ACTIVE MATERIAL FOR RECHARGEABLE BATTERY

(75) Inventors: Yukio Matsubara; Masami Ueda; Hidetoshi Inoue; Tadashi Fukami, all of Toyama (JP)

(73) Assignee: Fuji Chemical Industry Co., Ltd., Toyama (JP)

( * ) Notice: Subject to any disclaimer, the term of this patent is extended or adjusted under 35 U.S.C. 154(b) by 0 days.

(21) Appl. No.: 09/242,308

(22) PCT Filed: Aug. 11, 1997

(86) PCT No.: PCT/JP97/02803

§ 371 (c)(1),
(2), (4) Date: Feb. 12, 1999

(87) PCT Pub. No.: WO98/06670

PCT Pub. Date: Feb. 19, 1998

(30) Foreign Application Priority Data

Aug. 12, 1996 (JP) ................................ 8-231396
Dec. 20, 1996 (JP) ................................ 8-355120

(51) Int. Cl.⁷ .......................... C01G 51/00; C01G 53/00; C01G 45/00; C01D 15/00; C01F 7/00
(52) U.S. Cl. .......................... 423/594; 423/599; 423/600
(58) Field of Search ................... 423/594, 599, 423/600; 429/221, 223, 224

(56) References Cited

U.S. PATENT DOCUMENTS 5,648,057 A  *  7/1997  Ueda et al. ................. 423/599
6,045,771 A  *  4/2000  Matsubara et al. ......... 423/600

FOREIGN PATENT DOCUMENTS

WO    WO-94/22767 A1  * 10/1994
WO    WO-97/19023 A1  *  5/1997

* cited by examiner

Primary Examiner—Steven Bos
(74) Attorney, Agent, or Firm—Nath & Associates PLLC; Harold L. Novick

(57) ABSTRACT

There can be provided a positive electrode active material for a secondary battery which is excellent in the charging and discharging cycle characteristics so that it retains high battery capacity that is comparable to the hitherto known $LiNiO_2$ even by increasing the number of cycle, which has an improved cycle property (stability) at high temperature and which is a complex oxide represented by the general formula (I)

$$Li_yNi_{1-x}Co_{x1}M_{x2}O_2 \quad (I)$$

(wherein M represents at least one element selected from the group consisting of Al, Fe, Mn and B, y represents $0.9 \leq y \leq 1.3$, x represents $0 < x \leq 0.5$, $x_1$ represents $0 < x_1 < 0.5$, $x_1 + x_2$ x, when M is at least one element of Al, Fe and Mn, $x_2$ represents $0 < x_2 \leq 0.3$, when M is B, $x_2$ is $0 < x_2 \leq 0.1$, when M is the combination of B and at least one element of Al, Fe and Mn, $x_2$ represents $0 < x_2 < 0.3$ but the ratio occupied by B therein is in a range of from 0 to 0.1).

2 Claims, 13 Drawing Sheets

LITHIUM/NICKEL/COBALT COMPOSITE OXIDE, PROCESS FOR PREPARING THE SAME, AND CATHODE ACTIVE MATERIAL FOR RECHARGEABLE BATTERY

TECHNICAL FIELD

The present invention relates to a process for preparing a lithium nickel cobalt complex oxide having a high purity, a high crystallinity, a high battery capacity and stable structure so that the degree of decrease in the capacity is little even with increasing the number of charging and discharging cycles, and to a positive electrode active material for a secondary battery which contains said lithium nickel cobalt complex oxide as an effective ingredient.

BACKGROUND ART

As electronic appliances have been rendered small and portable in recent years, there has been increased a demand for a lithium ion secondary battery having a light weight and a high energy density in place of nickel/cadmium battery and nickel hydrogen battery.

As active materials of a positive electrode for this lithium ion secondary battery, there are known $LiNiO_2$ and $LiCoO_2$ which are layered compounds capable of intercalating and deintercalating lithium ions. Of them, $LiNiO_2$ is preferred due to its higher electrical capacity than $LiCoO_2$.

However, $LiNiO_2$ has not yet been put to practical use because it has problems in the charging and discharging cycle characteristics, the storage stability and the stability at a high temperature. Only $LiCoO_2$ has been practically used as the positive electrode active material.

Although various attempts have been made to improve the above faults of $LiNiO_2$ for its utilization as the positive electrode active material for a secondary battery, there has not yet been realized one wherein all of the above faults have been solved.

That is, in case of $LiNiO_2$ it is known that when many lithium ions are liberated therefrom (during charge), the structure becomes unstable owing to the two dimensional structure and therefore the cycle property, storage stability and high temperature stability of the lithium ion secondary battery are poor [for example, see J. Electrochem. Soc., 140 [7] p. 1862–1870 (1993), Solid State Ionics, 69 p. 265–70 (1994)]. Although many attempts have been made to stabilize the structure by replacing a portion of Ni with other components (Co, Mn, Fe, Ti, V etc.) for the purpose of securing the structure stability with elimination of the above faults, it was difficult to obtain highly purified and completely doped crystals as a solid solution on an industrial scale because there have been practically applied dry blending and heating processes.

Also, an attempt has been made to control to certain specific levels of the physical properties such as the shape and size of $LiNiO_2$ particles and its doped product with other components as solid solution. However, satisfactory results could not be achieved. For example, Japanese Patent Laid-open No. 151998/1993 proposes an improvement wherein the particle size distribution is specified to such extent that 10% cumulative size is 3~15 μm, 50% cumulative size 8~35 μm and 90% cumulative size 30~80 μm. However, it is very difficult to adjust the particle size distribution to such an extent by grinding the positive electrode active material.

Usually, $LiNiO_2$ has been prepared by mixing lithium components (LiOH, $Li_2CO_3$, $LiNO_3$ etc.) with nickel components (hydroxide, carbonate etc.) in a dry state and thereafter subjecting the mixture to the reaction, and hence the heating at an elevated temperature for a long time was required. Consequently, the crystal growth proceeds but some of lithium is evaporated off and NiO as a by-product is formed, thereby lowering the purity.

Therefore, it was difficult to prepare highly purified product by the dry process in cases where the primary particle size is small. On the other hand, in cases where the primary particle size is large, a considerable lattice defect in the structure is caused resulting in a lowering of the purity. It was impossible to adjust crystal size as desired while keeping crystallinity and purity at high levels by the dry process.

DISCLOSURE OF THE INVENTION

An object of the present invention is to provide a process for preparing a lithium nickel cobalt complex oxide which has improved properties with respect to the above faults of the hitherto known $LiNiO_2$ and its related complex oxide, namely which has a high purity, a high crystallinity, a high battery capacity and stable structure so that the degree of decrease in the capacity is little even by increasing the number of charging and discharging cycles.

Another object of the present invention is to provide a process for preparing said lithium nickel cobalt complex oxide via wet process which is different from the hitherto known dry process whereby the size of the formed spherical and secondary and primary particle may be set to a desired size.

A further object of the present invention is to provide a positive electrode active material for a lithium ion secondary battery containing as an effective component said lithium nickel cobalt complex oxide.

As a result of having studied ardently to achieve the above objects, the present inventors have found that a complex oxide which may be represented by the following general formula (I) and which may be prepared at the first time by a wet process described later coincides with the above objects;

$$Li_yNi_{1-x}Co_{x1}M_{x2}O_2 \qquad (I)$$

(wherein M represents at least one element selected from the group consisting of Al, Fe, Mn and B. y represents $0.9 \leq y \leq 1.3$, $x_1+x_2=x$, x represents $0<x \leq 0.5$, $x_1$ represents $0<x_1<0.5$; when M is at least one element among Al, Fe and Mn, $x_2$ represents $0<x_2 \leq 0.3$; when M is B, $x_2$ represents $0<x_2<0.1$ and when M is a combination of B and at least one element among Al, Fe and Mn, $x_2$ represents $0<x_2<0.3$ wherein the proportion occupied by B is in the range of being larger than 0 but being smaller than 0.1).

The complex oxide which may be obtained by the process of the present invention has the following features.

The first feature lies in the composition represented by the above general formula (I).

Holding as high a battery capacity as $LiNiO_2$, the disclosed composition has improved cycle properties (i.e. lowered deterioration of discharge capacity when increasing the number of cycles), high temperature stability, and uses less expensive cobalt.

The second feature of the complex oxide lies in having a high crystallinity and a high purity as identified by its X-ray diffraction pattern. That is, it is highly purified complex oxide to such extent that an X-ray diffraction pattern shows that a ratio in the peak intensity of the face (003) to the face (104) i.e., (003)/(104) is 1.2 or higher and a ratio in the peak intensity of the face (006) to the face (101) i.e., (006)/(101)

is 0.13 or lower, said face being defined by Miller indices hkl, the proportion of ($Ni^{3+}+Co^{3+}$) to the total (Ni+Co) being 99% by weight or higher, a BET specific surface area being 0.1~2 $m^2/g$, an average secondary particle size D being in the range of 5~100 $\mu m$ with 10% of the particle size distribution being 0.5D or higher and 90% 2D or lower, the surface of the spherical secondary particle being uneven as observed with a scanning electron microscope (SEM) and the primary particle constituting the spherical secondary particle being in the range of 0.2~30 $\mu m$ in terms of long diameter with the average diameter of 0.3~30 $\mu m$ as observed with a SEM.

In case of $LiNiO_2$ and its related complex oxide, when a part of the Ni is intended to be doped with other component (s) as the solid solution it is difficult to dope them homogeneously by the hitherto known dry process because the homogeneity is lowered in proportion to the amount added of other component(s) whereby not only is the battery capacity lowered but also the improvement to be achieved in the cycle property, the heat resistance and the electrolytic solution resistance are insufficient.

The lithium nickel cobalt complex oxide which may be obtained by the process of the present invention can be kept in high purity, in spite of being one doped with at least one element selected from the group consisting of Al, Fe, Mn and B. As shown in Examples described later, the interlayer distance may be efficiently shortened especially by using Co together with Al and/or B whereby the structural instability of Ni by reversible deintercalation of lithium ions can be avoided. The greatest feature in the process of the present invention is that Co and at least one element selected from the group consisting of Al, Fe, Mn and B may be doped as solid solution in a small amount and uniformly into the lithium nickel complex oxide. Such lithium nickel cobalt complex oxide can be obtained as the composition having a high purity and a high crystallinity by the wet process as described later.

The third feature of the complex oxide of the present invention is that there can be obtained uniform and primary particle and that shape and size of the secondary particle may be adjusted to that desired.

When attention is paid to the size of the primary particle, in general the size of the primary particle is important for a layered compound represented by $LiMO_2$ in the light of the reversible deintercalation of the lithium ion. The finer the primary particle, the better ionic conductivity in the inside of the solid and the lithium ion is more reversibly deintercalatable with the outside.

On the other hand, in considering the complex oxide from an aspect of the crystallization degree when the crystallization degree is small the crystal growth does not proceed sufficiently and the purity becomes low inevitably. Also, in the case that the primary particle is small the storage stability is poor owing to moisture absorpbility and so good battery characteristics can not be achieved stably. Moreover, it is desirable that the primary particle is large taking the high temperature resistance and the reactivity with the electrolytic solution into consideration. As a result of having studied ardently, the present inventors have succeeded in the preparation of the complex oxide having uniform primary particles of such that a long diameter of the primary particles is in the range of 0.2~30 $\mu m$, preferably 1~20 $\mu m$ by combined wet process-spray (or freeze) drying process-press molding and heating processes as described later.

A complex oxide wherein both the primary and secondary particles are uniform may be prepared by employing especially spray drying-heating processes. A long diameter of the primary particles is in the range of 0.2~30 $\mu m$, preferably 1~20 $\mu m$ and its average size is in the range of 0.3~30 $\mu m$ when observed with an SEM. An average size D of the spherical secondary particle formed by spray drying-heating processes is in the range of 5~300 $\mu m$, preferably 5~100 $\mu m$, more preferably 5~20 $\mu m$ and the particle is uniform to such extent that 10% of the particle size distribution is 0.5D or higher and 90% 2D or lower, and the surface of the spherical secondary particle is uneven as can be seen under observation of an SEM.

Also, the particle ratio (a ratio of the long diameter to the short diameter) of the spherical secondary particles when observed with an SEM lies in the range of a maximum of 1.5 or less and an average of 1.2 or less with 90% or more of them being distributed in 1.3 or less, indicating that they are uniform particles even when there was included some particles having slightly larger particle ratio than defined above in the complex oxide prepared by pulverization after the heating.

It is understood from such physical properties that not only the spherical product, preferably one which may be obtained by the spray drying-heating processes, is suitable for the closest packing density but also it has advantages when used as a battery that the contact surface with each an electrolyte and a conductive agent becomes large so it is easy to reversibly deintercalate Li ions with the outside.

The size of the spherical secondary particles can be set to the range of from 5 $\mu m$ to 100 $\mu m$ as desired. However, an average size of about 5~30 $\mu m$ is desirable for use as the battery material from the viewpoint of processibility. Also, the BET specific surface area lies in the range of 0.1~2 $m^2/g$. When it was used as the battery material, since there is no increase in the viscosity of an electrolyte, it does not cause a lowering in conductivity.

Also, for the purpose of setting the average long diameter of the primary particle to the range of about 1 $\mu m$~30 $\mu m$ it may be more simply and conveniently achieved by subjecting the spray (or freeze) dried product as abovementioned to press molding. In case that the primary particle is large, it has physical properties that the purity and the crystallinity degree are high and that the high temperature stability is excellent, and therefore it may be preferably used as the positive electrode active material for a secondary battery which would be used under a severe condition. The bulk density becomes large due to press molding being applied. That the bulk density is high is a plus for the elevation of the battery capacity.

The following illustrates a process for preparing the complex oxide represented by the above general formula (I) in accordance with the present invention.

In preparing the complex oxide represented by the above general formula (I), the following processes are applied according to the three kinds of classifications: ① M is at least one element of Al, Fe and Mn, ② M is B and ③ M is the combination of B and at least one element of Al, Fe and Mn.

That is, ① in a process for preparing a complex oxide represented by the general formula (I)

$$Li_yNi_{1-x}Co_{x1}M_{x2}O_2 \quad (I)$$

(wherein M is at least one element selected from the group consisting of Al, Fe and Mn), said complex oxide may be prepared by adding an amount of a lithium compound corresponding to the number of atomic moles of Li indicated by y to a basic metal salt represented by the general formula (II)

$$Ni_{1-x}Co_{x1}M_{x2}(OH)_{2(1-x+x1)+3\times 2-nz}(A^{n-})_z \cdot mH_2O \quad (II)$$

[wherein M represents at least one element selected from the group consisting of Al, Fe and Mn, x represents $0<x\leq 0.5$, $x_1$ is $0<x_1<0.5$, $x_2$ represents $0<x_2\leq 0.3$, $x_1+x_2=x$, $A^{n-}$ represents an anion having a valence of n ($n=1\sim 3$) and z and m are positive numbers respectively satisfying the ranges of $0.03\leq z\leq 0.3$, $0\leq m<2$] in an aqueous medium to form a slurry, spray or freeze drying the formed slurry and heating the spray or freeze dried product at a temperature of about 600° C.~900° C. for 4 hours or more in an oxidative atmosphere.

② In a process for preparing a complex oxide represented by the general formula (I)

$$Li_yNi_{1-x}Co_{x1}M_xO_2 \quad (I)$$

(wherein M represents B), said complex oxide may be prepared by adding a boron compound containing $x_2$ mol % of boron [$x_2$ represents $0<x_2<0.1$, the relationship among x, $x_1$ and $x_2$ is expressed by $x_2=x-x_1$] to a basic metal salt represented by the general formula (III)

$$Ni_{1-x}Co_{x1}(OH)_{2(1-x+x1)-nz}(A^{n-})_z \cdot mH_2O \quad (III)$$

[wherein x represents $0<x\leq 0.5$, $x_1$ represents $0<x_1<0.5$, $A^{n-}$ represents an anion having a valence of n ($n=1\sim 3$) and z and m represent positive numbers respectively satisfying the ranges of $0.03\leq z\leq 0.3$, $0\leq m<2$] in an aqueous medium, subsequently adding thereto an amount of a lithium compound corresponding to the number of atomic moles of Li indicated by y to form a slurry, spray or freeze drying the formed slurry and heating the spray or freeze dried product at a temperature of about 600° C.~900° C. for 4 hours or more in an oxidative atmosphere.

③ In a process for preparing a complex oxide represented by the general formula (I)

$$Li_yNi_{1-x}Co_{x1}M_{x2}O_2 \quad (I)$$

(wherein M represents the combination of B and at least one element selected from the group consisting of Al, Fe and Mn), said complex oxide may be prepared by adding a boron compound containing $x_4$ mol % of boron [$x_4$ represents $0<x_4<0.1$, the relationship among $x_4$, $x_3$ and $x_2$ is expressed by $x_4+x_3=x_2$] and an amount of a lithium compound corresponding to the number of atomic moles of Li indicated by y to a basic metal salt represented by the general formula (IV)

$$Ni_{1-x}Co_{x1}N_{x3}(OH)_{2(1-x+x1)+3\times 3-nz}(A^{n-})_z \cdot mH_2O \quad (IV)$$

[wherein N represents at least one element selected from the group consisting of Al, Fe and Mn, in this case M in the general formula (I) contains both the N and B, and if the content of B therein is indicated by $x_4$, x represents $0<x$ $0<x\leq 0.5$, $x_1$ represents $0<x_1<0.5$, $x_3$ represents $0<x_3\leq 0.3-x_4$, $x_1+x_3+x_4=x$, $A^{n-}$ represents an anion having a valence of n ($n=1\sim 3$), and z and m represent positive numbers respectively satisfying the ranges of $0.03\leq z\leq 0.3$, $0\leq m<2$] in an aqueous medium, to form a slurry, spray or freeze drying the formed slurry and heating the spray or freeze dried product at a temperature of about 600° C.~900° C. for 4 hours or more in an oxidative atmosphere.

As the water soluble lithium compound and the basic metal salt which may be represented by the general formulae (II), (III) or (IV) (hereinafter, referred to as "the basic metal salt" collectively), there may be employed one each containing an anion which is evaporated off during the heating.

As examples of the lithium compound, there may be selected one or more from among LiOH, LiNO$_3$, Li$_2$CO$_3$ and hydrates thereof.

As examples of the boron compound, boric acid and lithium tetraboric acid may be preferably employed.

As example of $A^{n-}$ in the basic metal salt, there may be selected from among the anions NO$_3^-$, Cl$^-$, Br$^-$, CH$_3$COO$^-$, CO$_3^{2-}$ and SO$_4^{2-}$.

In these compounds, LiOH as the lithium compound, boric acid as the boron compound and a basic metal salt wherein an anion is nitrate ion are used from the viewpoint of yield, reactivity, effective utilization of the resources and oxidation accelerating effect. The combination of these 3 kinds of compounds is particularly preferred from the viewpoint of battery characteristics.

As the basic metal salt which may be employed in the present invention, it is preferable that the basic salt having a specific composition that the size of the primary particle is fine as below 0.1 μm when measured by the Scherrer's method.

Also, it is preferred that this fine particle has a BET specific surface area of 10 m$^2$/g or higher, preferably 40 m$^2$/g or higher, more preferably 100 m$^2$/g or higher. As to the BET specific surface area, if it is measured after the basic metal salt in an aqueous solution has been dried, as the very fine primary particles aggregates during the dry process, then BET specific surface area of the aggregate is measured. If the aggregation power is strong, nitrogen gas cannot enter into it and the value of BET specific surface area becomes small. Accordingly the basic metal salt which is practically reacted with a lithium compound in aqueous solution shows a high BET specific surface area so that the surface is highly reactive. However, BET specific surface area was set to 10 m$^2$/g or higher from the above actual circumstances. The basic metal salt having such specific composition has a layered structure, and the chemical composition and the crystal structure where M is at least one of Al, Fe and Mn are similar to those of hydroxide of Ni$_{1-x}$Co$_{x1}$M$_{x2}$. The chemical composition and the crystal structure where M is B are similar to those of hydroxide of Ni$_{1-x}$Co$_{x1}$. And the chemical composition and the crystal structure where M is the combination of B and at least one of Al, Fe and Mn are similar to those of hydroxide of Ni$_{1-x}$Co$_{x1}$Ni$_{x3}$. Moreover, in all cases, the basic metal salt is microcrystalline whose surface is highly active. When it is reacted with a lithium compound such as LiOH, an extremely desirable precursor of Li$_y$Ni$_{1-x}$Co$_{x1}$M$_{x2}$O$_2$ is formed.

Highly purified Li$_y$Ni$_{1-x}$Co$_{x1}$M$_{x2}$O$_2$ having an extremely high crystallinity at which the present invention aims can be obtained only when the basic metal salt having such a specific composition is used. The hydroxides in the above are inferior in the reactivity with the lithium compound to the basic metal salt. On the other hand, when the amount of an anion in the basic metal salt is increased, the basic metal salt deviates from the layered structure, and the anion acts inhibitively on the formation of Li$_y$Ni$_{1-x}$Co$_{x1}$M$_{x2}$O$_2$ during heating, thereby the desired compound having a high purity and an extremely high crystallization degree cannot be obtained.

The basic metal salt to be used in the present invention can be prepared by adding an amount of about 0.7~0.95 equivalent, preferably about 0.8~0.95 equivalent of an alkali based on $Ni_{1-x}Co_{x1}M_{x2}$ salt, $Ni_{1-x}Co_{x1}$ salt or $Ni_{1-x}Co_{x1}N_{x3}$ salt under the condition below about 80° C. to effect the reaction. Examples of the alkali to be used in the reaction include alkali metal hydroxides such as sodium hydroxide, alkaline earth metal hydroxides such as calcium hydroxide, amines and the like. In this connection, it is preferable that this basic metal salt is matured at 20~70° C. for 0.1~10 hours after its preparation. Subsequently, any byproducts are removed by washing with water and the lithium compound is added, and the boron compound is further added for the purpose of preparing a complex oxide containing B.

For drying the slurry obtained by such a reaction, spray or freeze drying method is desirable. The spray drying method where drying can be instantaneously accomplished and the spherical particles can be obtained is preferred from the viewpoint of the spherical granulation nature and the uniformity of the composition (in dry process requiring some drying time, lithium migrates into the surface of particles to give a non-uniform composition).

The heating is effected at a temperature of 600° C.~800° C., preferably 700° C.~750° C. for 4 hours or higher, preferably about 4~72 hours; more preferably about 4~20 hours under an oxidative atmosphere (under the flow of oxygen). If the heating time is 72 hours or more, not only do costs increase but also it causes evaporation of Li thereby the proportion of trivalent (Ni+Co) to the total (Ni+Co) becomes rather low and the purity becomes bad.

In the known technique of the drying process, heating of at least 20 hours was required for Ni which is hard to convert into trivalent from divalent. In light of that fact, the process of the present invention which may be carried out even with a shorter heating time than 20 hours is very economical and advantageous.

The second process is a press molding process which is advantageous for the purpose of making the primary particle large and further making the bulk density high.

The dry product obtained by the spray drying or freeze drying process above-mentioned is press molded and then heated, whereby not only the size of the primary particle may be optionally set within the range of 1~30 $\mu$m, but also there can be obtained the complex oxide having high bulk density, degree of crystallization and purity.

The spherical particle that is the spray dried product is an excellent powder with respect to flowability, molding and filling properties, and it is a good material to be pressed into a shape according to the conventional manner.

Although the pressure for molding may be varied depending on the pressing machine to be applied and the amount to be fed and is not limited particularly, usually a pressure about 500~3,000 kg/cm$^3$ is suitable.

Pressing machine to be applied is not limited particularly and it may be one capable of pressing. However, tablet compressing machine, briquette, roller compactor may be suitably employed.

The density of the press molded product may be about 1~4 g/cc, preferably about 2~3 g/cc.

The press molding is very useful in that the moving distance among molecules becomes short and crystal growth during the heating is accelerated. Accordingly, it is not always necessary that the material to be subjected to the press molding is spray dried spherical particle product. The freeze dried product may also be used.

This press molded product can be heated as it is. The heating is effected at a temperature of usually 600° C.~900° C., preferably 700° C.~800° C. for a period of 4 hours or higher, preferably 10~72 hours under an atmosphere of oxygen.

The longer the heating time, the larger the size of the primary particle. Therefore, the heating time is determined depending on the desired size of the primary particle.

For accomplishing the heating in a short time, heating 2 times, pre-heating and after-heating may be applied. The slurry obtained by the process described previously is spray- or freeze-dried and the spray- or freeze-dried product is first pre-heated at a temperature of about 600° C.~900° C. for 0.5 hour or more (preferably 0.5~4 hours) under an oxidative atmosphere, the obtained pre-heating product is pulverized if necessary and pressed into a shape, and then after-heated at a temperature of about 600° C.~900° C. for 1 hour or more (preferably 4~48 hours) under an oxidative atmosphere. The total time required for the heating may be shortened by employing this process.

The thus obtained complex oxide which may be represented by the general formula (I) retains high battery capacity of 160~180 mAh/g even after 100 charging and discharging cycles and has an improved high temperature cycle property (stability) as is apparent from the Examples described later, and hence it may be effectively utilized as a positive electrode active material for a secondary battery.

BEST MODES FOR CARRYING OUT THE INVENTION

Figure 1:
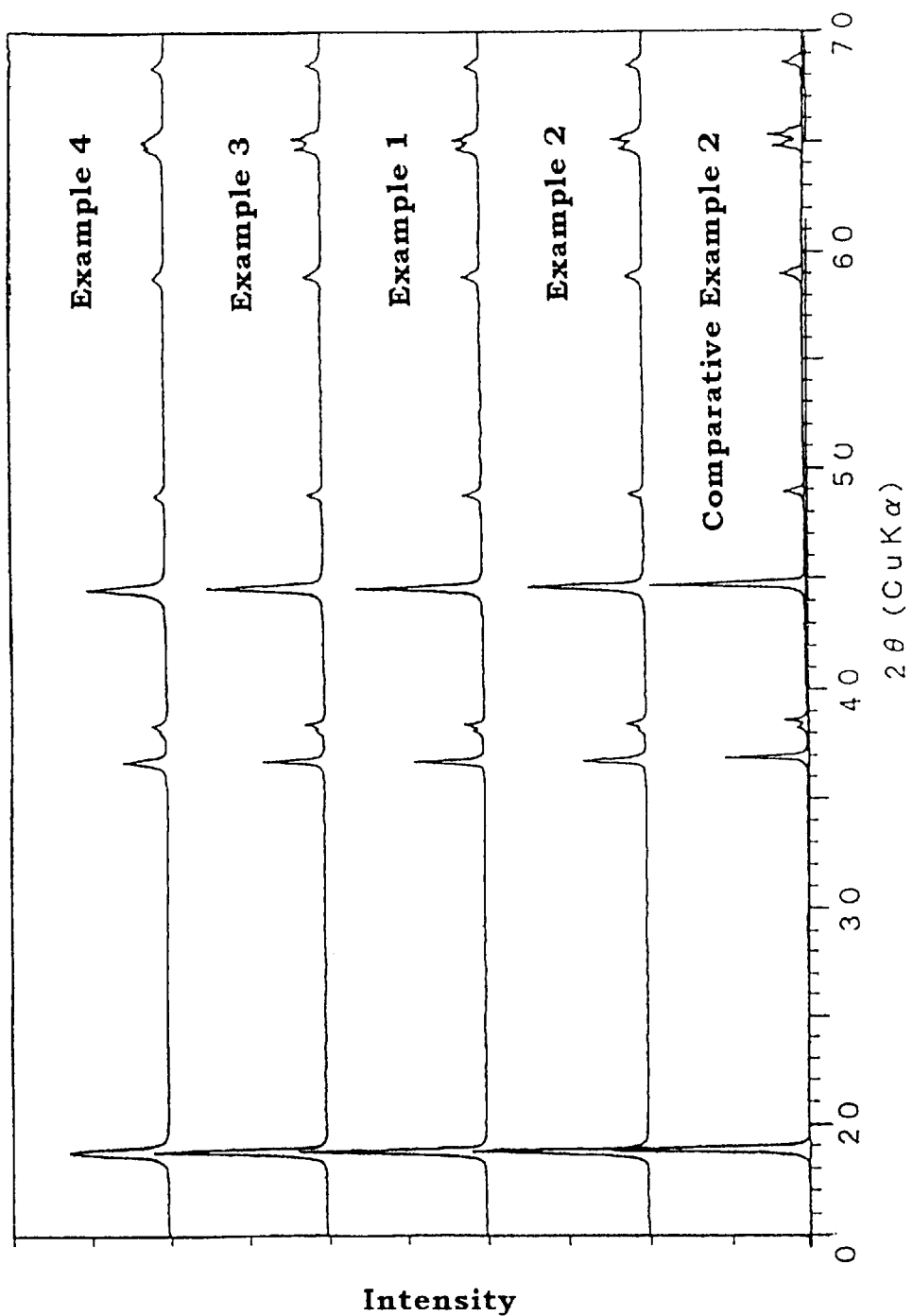
FIG. 1 is powder X-ray diffraction patterns of the complex oxides obtained in Examples 1~4 and Comparative Examples 1~2, respectively.

The present invention is more specifically illustrated by the following examples.

EXAMPLE 1

There was prepared a mixed aqueous solution of 2.0 M nickel nitrate and cobalt nitrate wherein the molar ratio of Ni:Co was 80:19. This mixed aqueous solution and 1.0 M aqueous sodium hydroxide solution were added to a reaction vessel under stirring using quantitative pumps while the amount added of aqueous sodium hydroxide solution was adjusted so as to maintain pH 8.0 at a reaction temperature of 25° C., thereby the continuous reaction was carried out. The residence time of average 10 minutes was taken.

The reaction product that overflowed from the reaction vessel during the continuous reaction was collected in the receiver tank. The reaction was completed when the necessary amount of the reaction product was collected.

The obtained reaction product was filtered, washed with water (the portion was dried after washing and its composition was $Ni_{0.8}Co_{0.19}(OH)1.833(NO_3)_{0.147}.0.16H_2O$) and suspended in water. And then, boric acid was added to the suspension in an amount such that the molar ratio of Ni:Co:B became 80:19:1 with respect to the Ni and Co contents in the suspension. To the resultant slurry 3.0 M aqueous lithium hydroxide solution was added dropwise in an amount such that the molar ratio of Li/(Ni+Co+B) became 1.05.

Thereafter, the reaction mixture was spray-dried. The obtained dry gel was put in an alumina boat and heated at 750° C. for 10 hours in an atmosphere of oxygen in a tube furnace (TF-630 type, a product of Yamada Electric Company).

The chemical composition of the heating product was $LiNi_{0.8}Co0.19B_{0.01}O_2$.

EXAMPLE 2

There was prepared a mixed aqueous solution of 2.0 M nickel nitrate and cobalt nitrate wherein the molar ratio of Ni:Co was 80:19.5. This mixed aqueous solution and 1.0 M aqueous sodium hydroxide solution were simultaneously added so as to maintain pH 8.0 according to similar manner as in Example 1, whereupon the continuous reaction was conducted at 25° C. for 10 minutes of the resident time.

The obtained reaction product was filtered, washed with water (the portion was dried after washing and its composition was $Ni_{0.8}Co_{0.195}(OH)_{1.86}(NO_3)_{0.130}.0.22H_2O$) and suspended in water. And then, boric acid was added to the suspension in such amount that the molar ratio of Ni:Co:B became 80:19.5:0.5 with respect to the Ni and Co contents in the suspension. To the resultant slurry 3.0 M aqueous lithium hydroxide solution was added dropwise in an amount such that the molar ratio of Li/(Ni+Co+B) became 1.05. Thereafter, the reaction mixture was spray dried. The obtained dry gel was put in an alumina boat and heated at 750° C. for 10 hours in an atmosphere of oxygen in a tube furnace (TF-630 type, a product of Yamada Electric Company).

The chemical composition of the heating product was $LiNi_{0.80}Co0.195B_{0.005}O_2$.

EXAMPLE 3

There was prepared a mixed aqueous solution of 2.0 M nickel nitrate and cobalt nitrate wherein the molar ratio of Ni:Co was 80:18. This mixed aqueous solution and 1.0 M aqueous sodium hydroxide solution were simultaneously added so as to maintain pH 8.0 according to similar manner as in Example 1, whereupon the continuous reaction was conducted at 25° C. for 10 minutes of the resident time.

The obtained reaction product was filtered, washed with water (the portion was dried after washing and its composition was $Ni_{0.8}Co_{0.18}(OH)_{1.79}(NO_3)_{0.17}0.3\ H_2O$) and suspended in water. And then, boric acid was added to the suspension in such amount that the molar ratio of Ni:Co:B became 80:18:2 with respect to the Ni and Co contents in the suspension. To the resultant slurry 3.0 M aqueous lithium hydroxide solution was added dropwise in an amount such that the molar ratio of Li/(Ni+Co+B) became 1.05. Thereafter, the reaction mixture was spray dried. The obtained dry gel was put in an alumina boat and heated at 750° C. for 10 hours in an atmosphere of oxygen in a tube furnace (TF-630 type, a product or Yamada Electric Company).

The chemical composition of the heating product was $LiNi_{0.80}Co0.18B_{0.02}O_2$.

EXAMPLE 4

There was prepared a mixed aqueous solution of 2.0 M nickel nitrate and cobalt nitrate wherein the molar ratio of Ni:Co was 80:15. This mixed aqueous solution and 1.0 M aqueous sodium hydroxide solution were simultaneously added so as to maintain pH 8.0 according to similar manner as in Example 1, whereupon the continuous reaction was conducted at 25° C. for 10 minutes of the resident time.

The obtained reaction product was filtered, washed with water (the portion was dried after washing and its composition was $Ni_{0.8}Co_{0.15}(OH)_{1.76}(NO_3)_{0.14}\ 0.25H_2O$) and suspended in water. And then, boric acid was added to the suspension in such amount that the molar ratio of Ni:Co:B became 80:15:5 with respect to the Ni and Co contents in the suspension. To the resultant slurry 3.0 M aqueous lithium hydroxide solution was added dropwise in an amount such that the molar ratio of Li/(Ni+Co+B) became 1.05. Thereafter, the reaction mixture was spray dried. The obtained dry gel was put in an alumina boat and heated at 750° C. for 10 hours in an atmosphere of oxygen in a tube furnace (TF-630 type, a product of Yamada Electric Company).

The chemical composition of the heating product was $LiNi_{0.80}Co0.15B_{0.005}O_2$.

Comparative Example 1

There was prepared a mixed aqueous solution. of 2.0 M nickel nitrate and cobalt nitrate wherein the molar ratio of Ni:Co was 80:10. This mixed aqueous solution and 1.0 M aqueous sodium hydroxide solution were simultaneously added so as to maintain pH 8.0 according to similar manner as in Example 1, whereupon the continuous reaction was conducted at 25° C. for 10 minutes of the resident time.

The obtained reaction product was filtered, washed with water (the portion was dried after washing and its composition was $Ni_{0.8}Co_{0.01}(OH)_{1.68}(NO_3)_{0.12}\ 0.19H_2O$) and suspended in water. And then, boric acid was added to the suspension in such amount that the molar ratio of Ni:Co:B became 80:10:10 with respect to the Ni and Co contents in the suspension. To the resultant slurry 3.0 M aqueous lithium hydroxide solution was added dropwise in an amount such that the molar ratio of Li/(Ni+Co+B) became 1.05. Thereafter, the reaction mixture was spray dried. The obtained dry gel was put in an alumina boat and heated at 750° C. for 10 hours in an atmosphere of oxygen in a tube furnace (TF-630 type, a product of Yamada Electric Company).

The chemical composition of the heating product was $LiNi_{0.80}Co_{0.10}O_2$.

Comparative Example 2

There was prepared a mixed aqueous solution of 2.0 M nickel nitrate and cobalt nitrate wherein the molar ratio of Ni:Co was 80:20. This mixed aqueous solution and 1.0 M aqueous sodium hydroxide solution were simultaneously added so as to maintain pH 8.0 according to similar manner as in Example 1, whereupon the continuous reaction was conducted at 25° C. for 10 minutes of the resident time.

The obtained reaction product was filtered, washed with water (the portion was dried after washing and its composition was $Ni_{0.8}Co_{0.2}(OH)_{1.87}(NO_3)_{0.13}$ $0.14H_2O$) and suspended in water. And then, 3.0 M aqueous lithium hydroxide solution was added dropwise to the suspension in an amount such that the molar ratio of Li/(Ni+Co) became 1.05. Thereafter, the reaction mixture was spray dried. The obtained dry gel was put in an alumina boat and heated at 750° C. for 10 hours in an atmosphere of oxygen in a tube furnace (TF-630 type, a product of Yamada Electric Company).

The chemical composition of the firing product was $LiNi_{0.80}Co_{0.20}O_2$.

Comparative Example 3 (Dry Process Corresponding to Example 1)

1.00 Mol lithium hydroxide, 0.80 mol nickel hydroxide, 0.19 mol cobalt hydroxide and 0.01 mol boric acid were sufficiently mixed in dry state and pulverized in a mortar, and then pelletized into size of 14 mm of a diameter×2 mm of a thickness. The resultant pellets were heated at 750° C. for 48 hours in an atmosphere of oxygen.

The chemical composition of the heat-treated product was $LiNi_{0.80}Co_{0.19}B_{0.01}O_2$.

The respective powder X-ray diffraction patterns of the complex oxides obtained Examples 1~4 and Comparative Examples 1~2 are shown in FIG. 1. As is apparent from FIG. 1, any peak based on by-product was not recognized in each process and the complex oxides are estimated to have uniformly doped layered structure.

Figure 2:
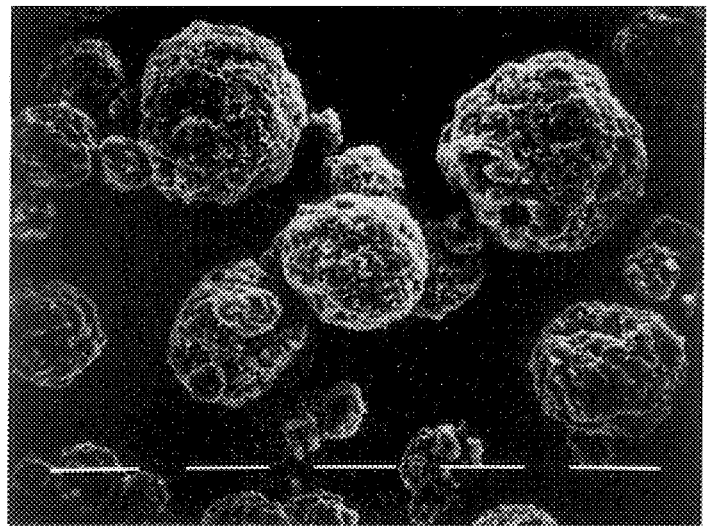
FIG. 2 is SEM photograph (×1,500 magnifications) indicating the primary particles of the complex oxide obtained in Example 1.
Figure 3:
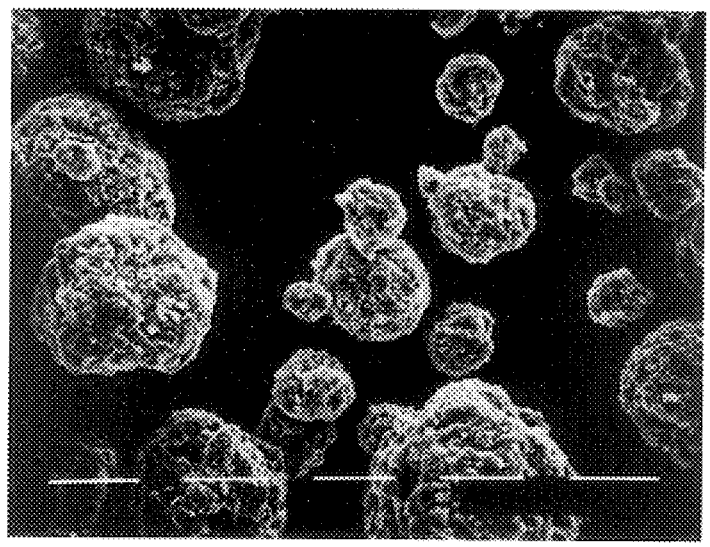
FIG. 3 is SEM photograph (×1,500 magnifications) indicating the primary particles of the complex oxide obtained in Example 4.

The respective SEM photographs (×1,500 magnifications) indicating the primary particles of the complex oxides obtained in Examples 1 and 4 are shown in FIGS. 2 and 3.

The scale unit of—line shown in the lower part of the respective photographs indicates 10 μm.

Also, the respective crystalline sizes estimated from the X-ray diffraction measured with respect to the basic metal salts obtained by the continuous reaction in Examples 1~4 stated above and Examples 5~12 described later are summarized in table 1. It can be seen from table 1 that the crystalline size is below 0.1 μ in all cases, indicating that there was formed the basic metal salt having a fine primary particle.

TABLE 1

Crystalline Size of Basic Metal Salt Obtained by the Continuous Reaction

| No. | Crystalline Size (angstrom) |
| --- | --- |
| Example 1 | 38.1 |
| Example 2 | 42.5 |
| Example 3 | 34.6 |
| Example 4 | 45.1 |
| Example 5 | 37.9 |
| Example 6 | 46.2 |
| Example 7 | 37.4 |
| Example 8 | 38.1 |
| Example 9 | 35.3 |
| Example 10 | 40.5 |
| Example 11 | 43.5 |
| Example 12 | 41.4 |

Furthermore, the ratio of the trivalence in (Ni+Co) and the physical properties such as BET specific surface area, the peak intensity ratios (003)/(104) and (006)/(101) estimated by powder X-ray diffraction, an average secondary particle size measured by laser microtrack and long diameter of the primary particle obtained from observation of the SEM photograph, each measured with respect to these complex oxides are shown in table 2.

The trivalent (Ni+Co) ratio and the BET specific surface area were measured according to Experimental Examples 2 and 3, respectively.

TABLE 2

| No. | Ratio of the Trivalence in (Ni + Co) (%) | BET $m^2/g$ | Ratio of (003)/(104) | Ratio of (006)/(101) | Average Secondary Particle Size (μm) | Average Long Diameter of Primary Particle (μm) |
| --- | --- | --- | --- | --- | --- | --- |
| Example 1 | 99.8 | 0.1 | 1.310 | 0.101 | 15.21 | 0.72 |
| Example 2 | 99.7 | 0.2 | 1.304 | 0.102 | 17.21 | 0.65 |
| Example 3 | 99.9 | 0.1 | 1.273 | 0.111 | 18.01 | 0.62 |
| Example 4 | 99.1 | 0.1 | 1.211 | 0.106 | 16.42 | 0.68 |
| Comparative Example 1 | 89.5 | 0.2 | 0.873 | 0.268 | 17.21 | 0.61 |
| Comparative Example 2 | 99.6 | 0.1 | 1.245 | 0.104 | 18.21 | 0.67 |

From the results shown in table 2, in case that M in the general formula (I) is B, the complex oxide of Comparative Example 1 wherein the amount added (content) of B is 10 mol % has low trivalent ratio. The peak intensity ratio of (003)/(104) obtained by the powder X-ray diffraction is lower than 1.2 while that of (006)/(101) is higher than 0.13 and thus the crystallinity is low. For these facts, in the case that M in the general formula (I) is B, it is more preferable that the numerical value of $x_2$ is $0<x_2 \leq 0.05$.

With respect to other physical properties, the complex oxides in the above Examples and Comparative Examples 1~2 have similar physical properties as each other because all of them were prepared by wet-spray drying process.

Moreover, table 3 shows the results of the battery test (charge and discharge test) conducted according to Experimental Example 4 using the respective complex oxides of Examples 1~4 and Comparative Examples 1~2 to evaluate initial discharge capacity (mAh/g), discharge capacity at 100th cycle (mAh/g) and decrease rate of discharge capacity at 100th cycle (%). In comparison with the complex oxide of Comparative Example 3 prepared by dry process, the complex oxides of Examples 1~4 were recognized to have the improved cycle characteristics and initial discharge capacity.

TABLE 3

| No. | Initial Discharge Capacity (mAh/g) | Discharge Capacity at 100th Cycle (mAh/g) | Decrease Rate of Discharge Capacity at 100th Cycle (%) |
| --- | --- | --- | --- |
| Example 1 | 187 | 182 | 2.7 |
| Example 2 | 183 | 174 | 5.9 |
| Example 3 | 184 | 178 | 3.3 |
| Example 4 | 178 | 167 | 6.2 |
| Comparative Example 1 | 152 | 89 | 41.4 |
| Comparative Example 2 | 184 | 171 | 9.3 |
| Comparative Example 3 | 163 | 112 | 31.2 |

It can be seen from table 3 that the complex oxides of Examples 1~4, each containing boron, have improved cycle characteristics in comparison with the complex oxide of Comparative Example 2 containing no boron, and especially the complex oxides of Examples 1~3 wherein the content of boron is in the range of 0.05~2 mol % have further improved initial discharge capacity.

EXAMPLE 5

There was prepared a mixed aqueous solution of 2.0 mol/l nickel nitrate, cobalt nitrate and aluminum nitrate wherein the molar ratio of Ni:Co:Al was 8:1:1. This mixed aqueous solution and 1.0 mol/l aqueous sodium hydroxide solution were continuously added under the condition of the reaction pH of 8.0, the reaction temperature of 25° C. and vigorous stirring.

The obtained reaction mixture was filtered, washed with water and suspended in water thereby obtaining a $Ni_{0.80}Co_{0.10}Al_{0.10}(OH)_{1.7}(NO_3)_{0.40}$ slurry. A 3.0 mol/l aqueous lithium hydroxide solution was added dropwise to the obtained slurry in an amount such that the atomic ratio of Li/(Ni+Co+Al) was 1.05 with respect to the (Ni+Co+Al) content in the above slurry to effect reaction. Thereafter, the reaction mixture was spray dried. The obtained dry gel was put in an alumina boat and heated at 750° C. for 10 hours in an atmosphere of oxygen in a tube furnace, and pulverized in a mortar to obtain powdery $LiNi_{0.797}Co_{0.101}Al_{0.102}O_2$.

EXAMPLE 6

There was prepared a mixed aqueous solution of 2.0 mol/l nickel nitrate, cobalt nitrate and aluminum nitrate wherein the molar ratio of Ni:Co:Al was 16:3:1. This mixed aqueous solution and 1.0 mol/l aqueous sodium hydroxide solution were continuously added under the condition of the reaction pH of 8.0, the reaction temperature of 25° C., and vigorous stirring.

The obtained reaction mixture was filtered, washed with water and suspended in water thereby obtaining a $Ni_{0.80}Co_{0.15}Al_{0.05}(OH)_{1.7}(NO_3)_{0.35}$ slurry. A 3.0 mol/l aqueous lithium hydroxide solution was added dropwise to the obtained slurry in an amount such that the atomic ratio of Li/(Ni+Co+Al) was 1.05 with respect to the (Ni+Co+Al) content in the above slurry to effect reaction. Thereafter, the reaction mixture was spray dried. The obtained dry gel was pressed into a pellet having φ 14 and a thickness of 2 mm under pressure of 2 t/cm² using a static compressor. The pellet was put in an alumina boat and heated at 750° C. for 48 hours in an atmosphere of oxygen in a tube furnace, and pulverized in a mortar to obtain powdery $LiNi_{0.785}Co_{0.161}Al_{0.054}O_2$.

EXAMPLE 7

There was prepared a mixed aqueous solution of 2.0 mol/l nickel nitrate, cobalt nitrate and aluminum nitrate wherein the molar ratio of Ni:Co:Al was 16:3:1. This mixed aqueous solution and 1.0 mol/l aqueous sodium hydroxide solution were continuously added under the condition of the reaction pH of 8.0, the reaction temperature of 25° C. and vigorous stirring.

The obtained reaction mixture was filtered, washed with water and suspended in water thereby obtaining a $Ni_{0.80}Co_{0.15}Al_{0.05}(OH)_{1.7}(NO_3)_{0.35}$ slurry. A 3.0 mol/l aqueous lithium hydroxide solution was added dropwise to the obtained slurry in an amount such that the atomic ratio of Li/(Ni+Co+Al) was 1.05 with respect to the (Ni+Co+Al) content in the above slurry to effect reaction. Thereafter, the reaction mixture was freeze dried. The obtained dry gel was pressed into a pellet having φ 14 and a thickness of 2 mm under pressure of 2 t/cm² using a static compressor. The pellet was put in an alumina boat and heated at 750° C. for 48 hours in an atmosphere of oxygen in a tube furnace, and pulverized in a mortar to obtain powdery $LiNi_{0.798}Co_{0.151}Al_{0.051}O_2$.

Figure 4:
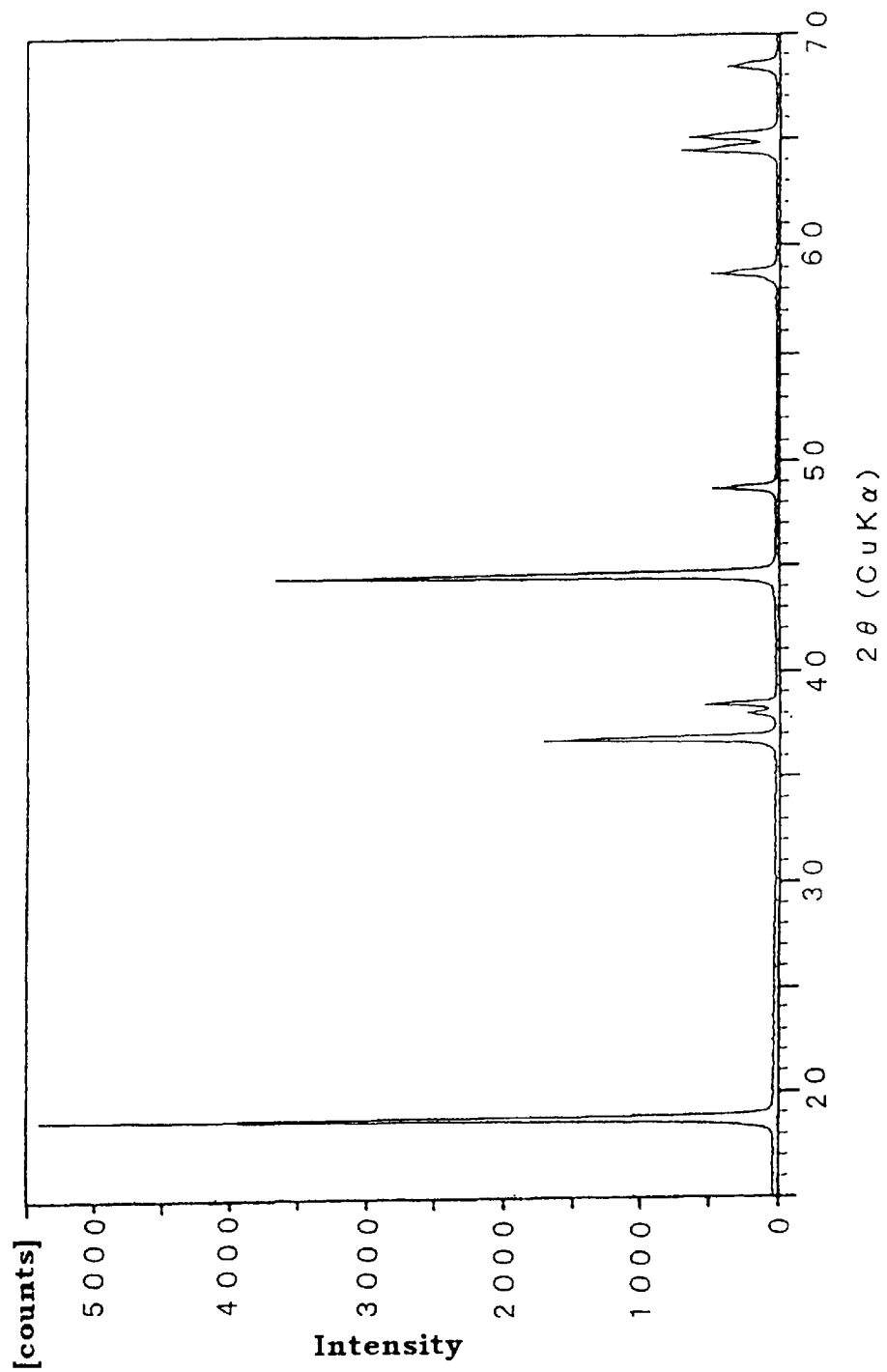
FIG. 4 is powder X-ray diffraction pattern of the complex oxide obtained in Example 5.
Figure 5:
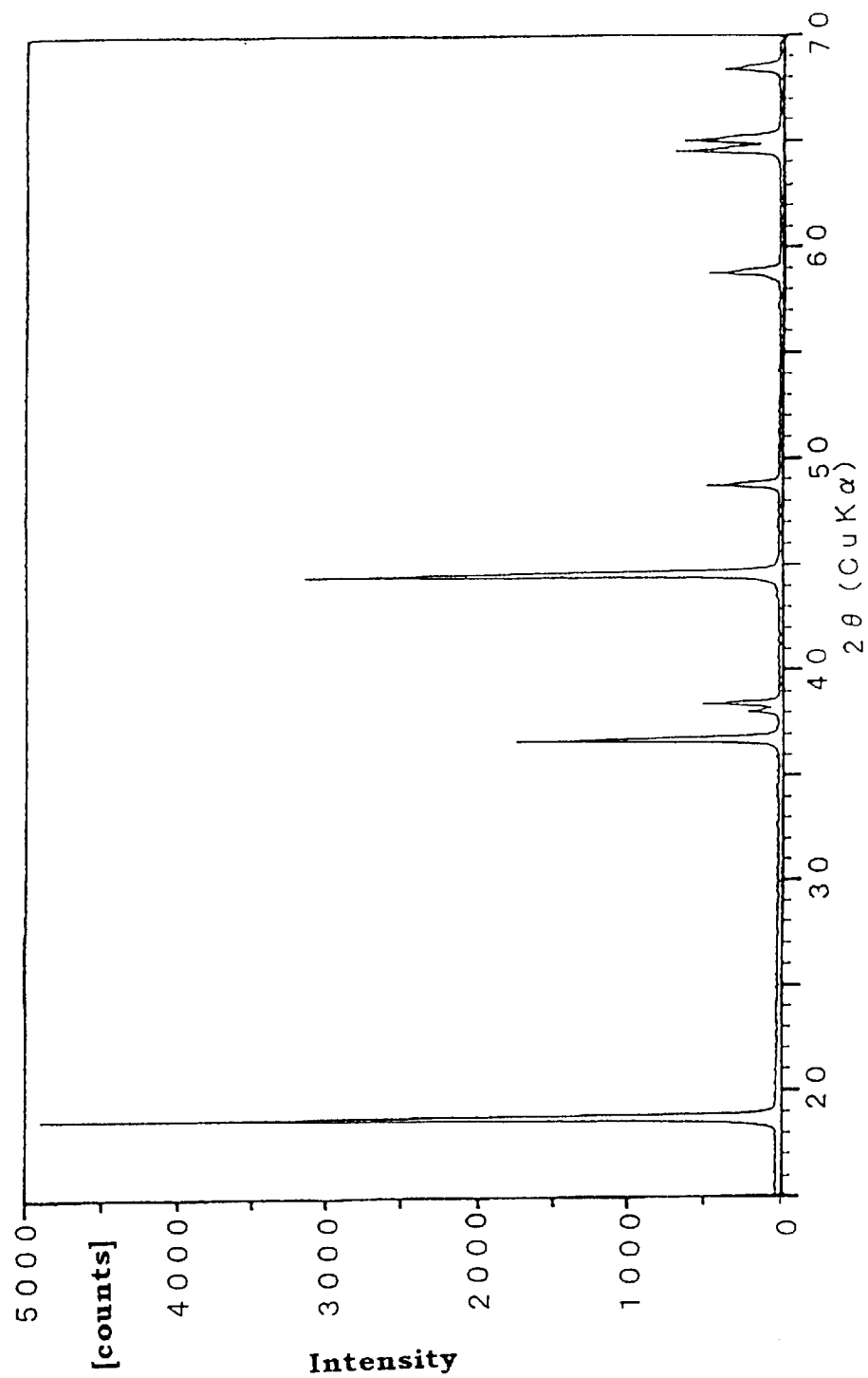
FIG. 5 is powder X-ray diffraction pattern of the complex oxide obtained in Example 6.
Figure 6:
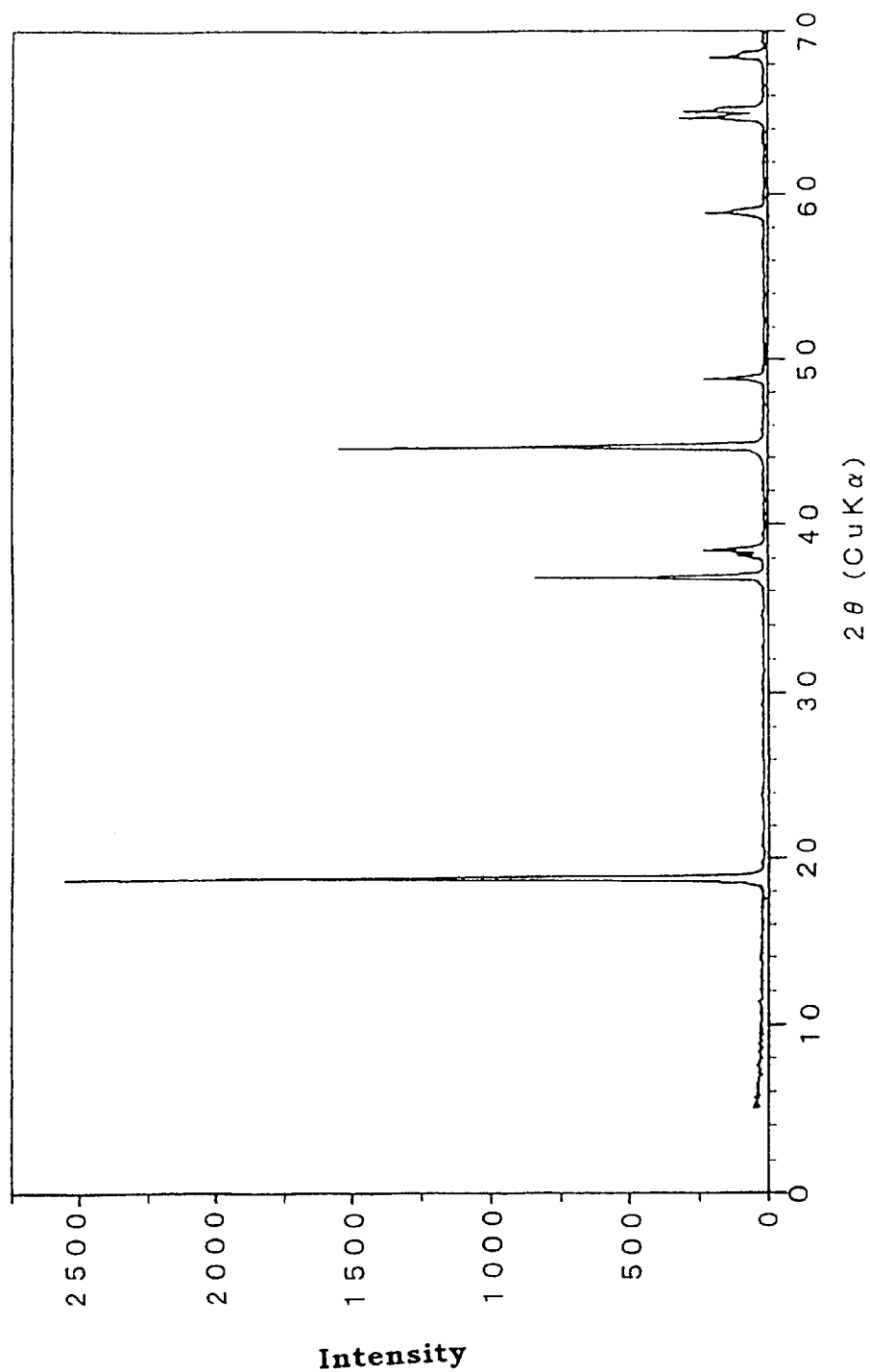
FIG. 6 is powder X-ray diffraction pattern of the complex oxide obtained in Example 7.

The respective powder X-ray diffraction patterns of the complex oxides obtained in Examples 5, 6 and 7 are shown in FIGS. 4, 5 and 6. As is apparent from them, any peak based on by-product was not recognized in each process and the complex oxides are estimated to have uniformly doped layered structure.

Figure 7:
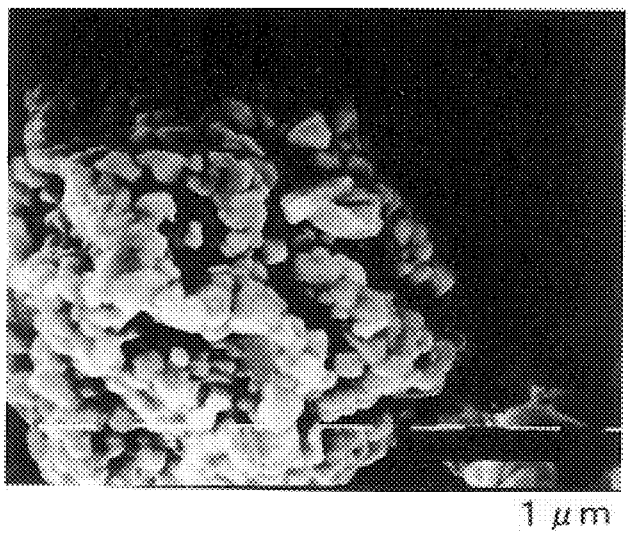
FIG. 7 is SEM photograph (×30,000) of the complex oxide obtained in Example 5.
Figure 8:
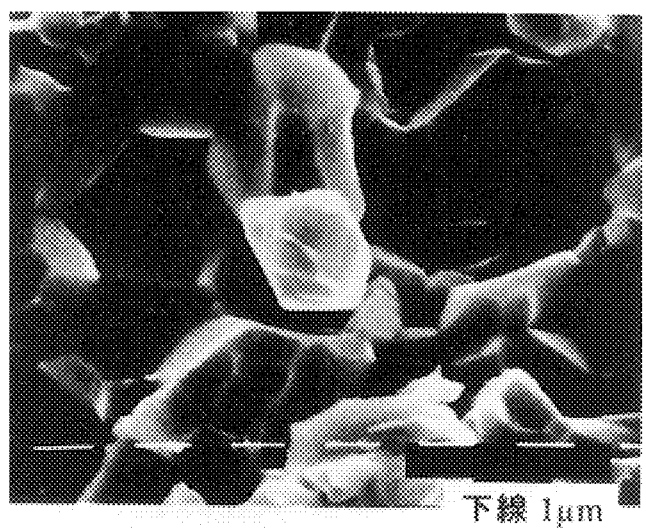
FIG. 8 is SEM photograph (×3,000 magnifications) indicating the primary particles of the complex oxide obtained in Example 6.
Figure 9:
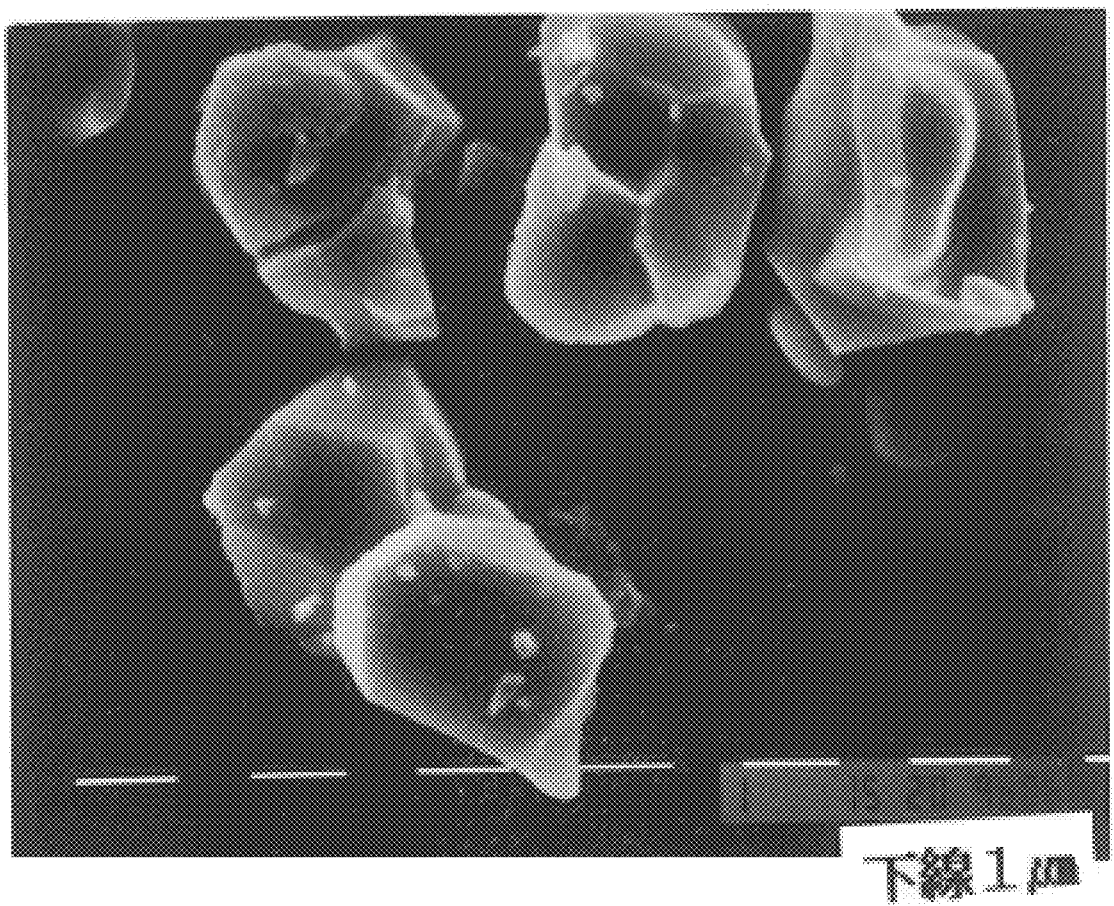
FIG. 9 is SEM photograph (×10,000 magnifications) indicating the primary particles of the complex oxide obtained in Example 7.
Figure 10:
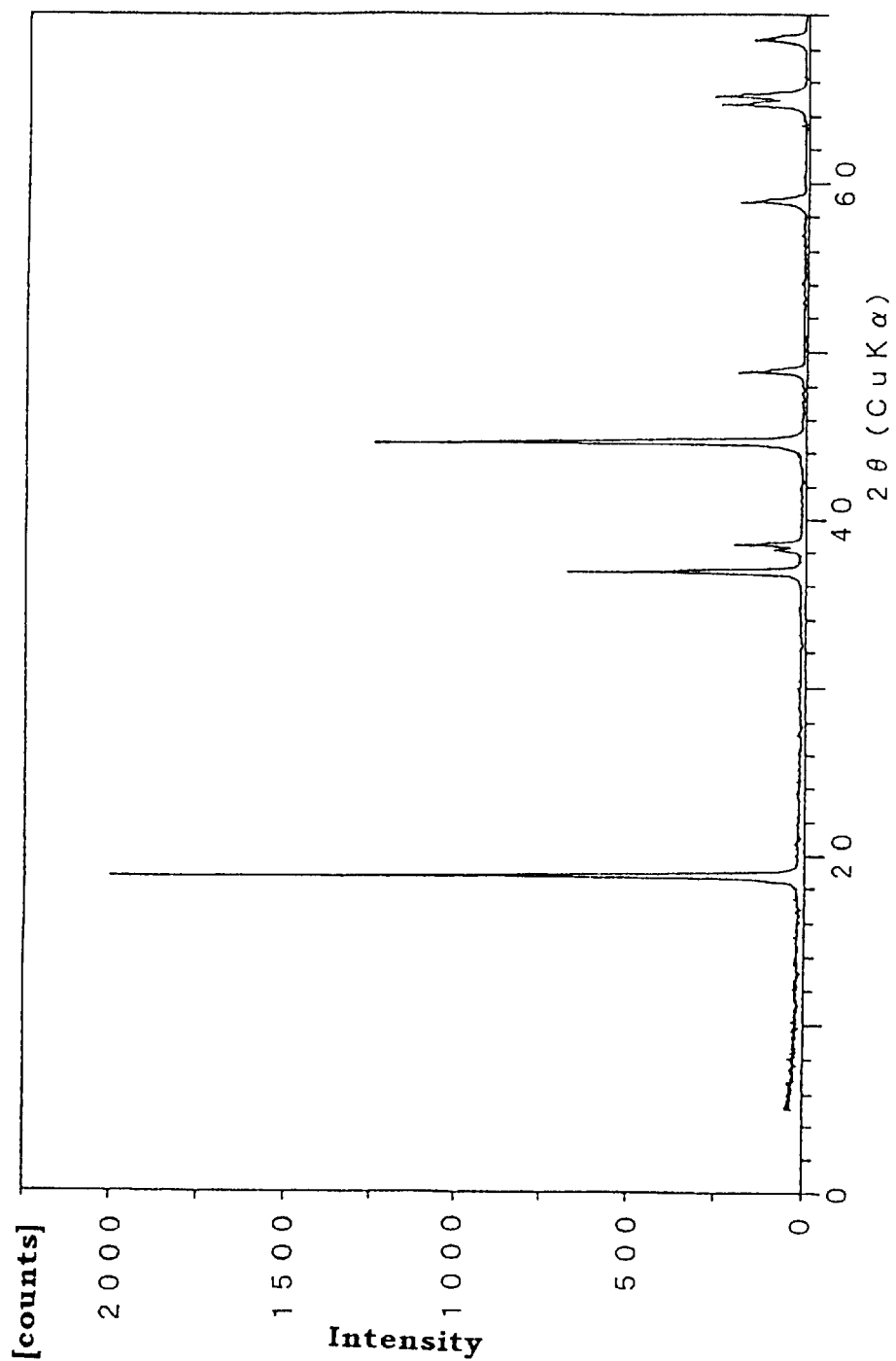
FIG. 10 is powder X-ray diffraction pattern of the complex oxide obtained in Example 8.
Figure 11:
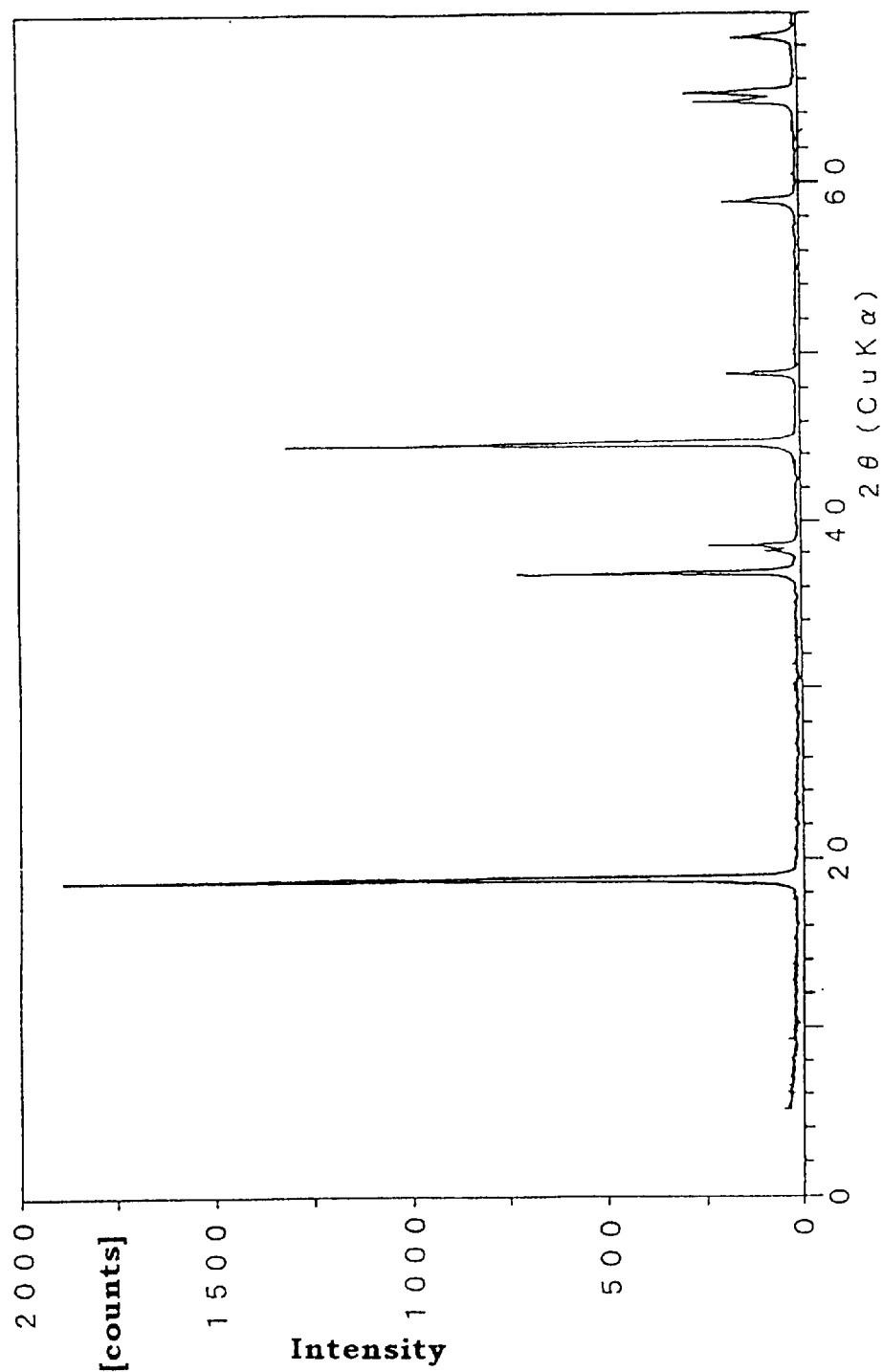
FIG. 11 is powder X-ray diffraction pattern of the complex oxide obtained in Example 9.
Figure 12:
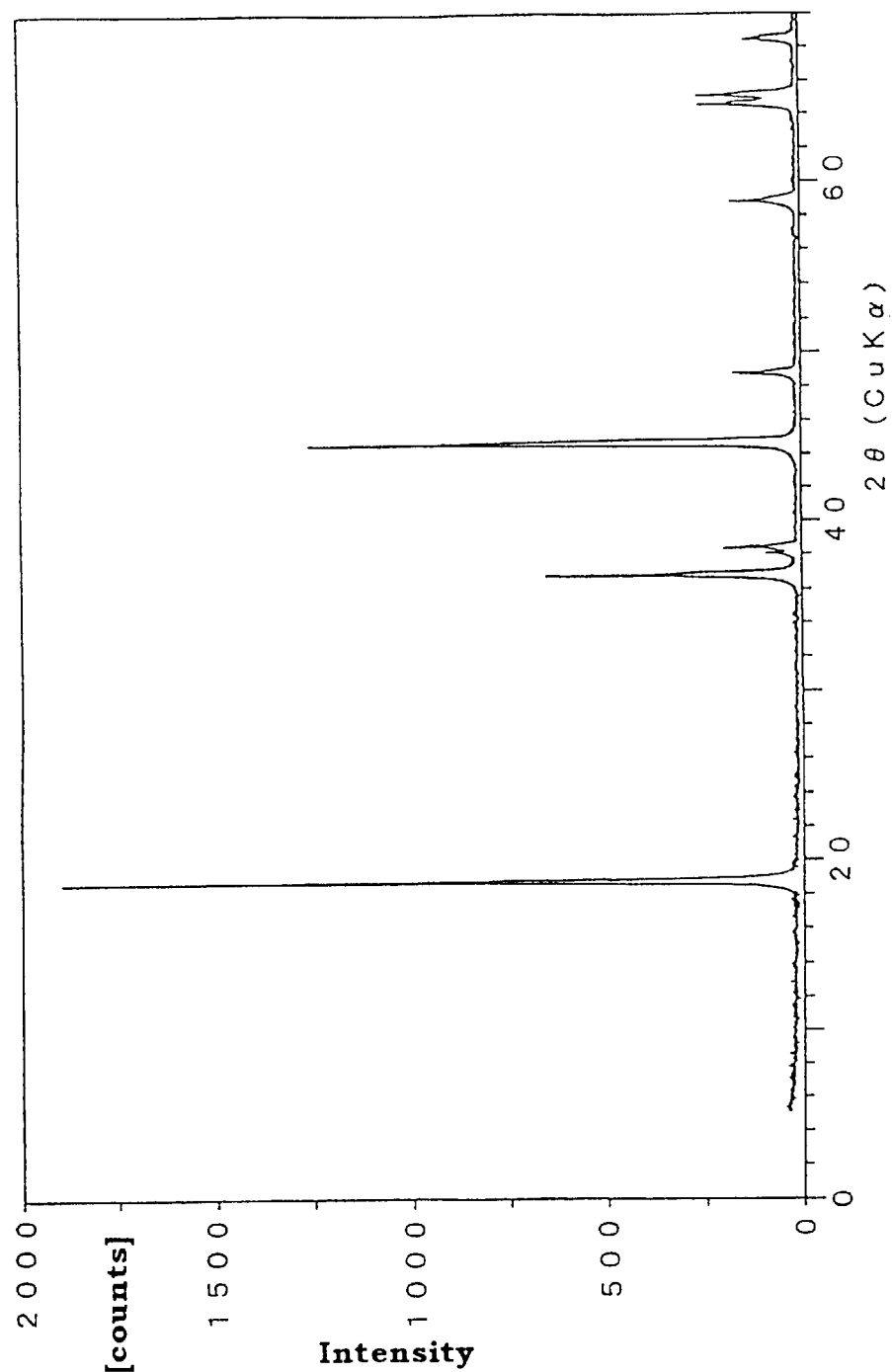
FIG. 12 is powder X-ray diffraction pattern of the complex oxide obtained in Example 10.
Figure 13:
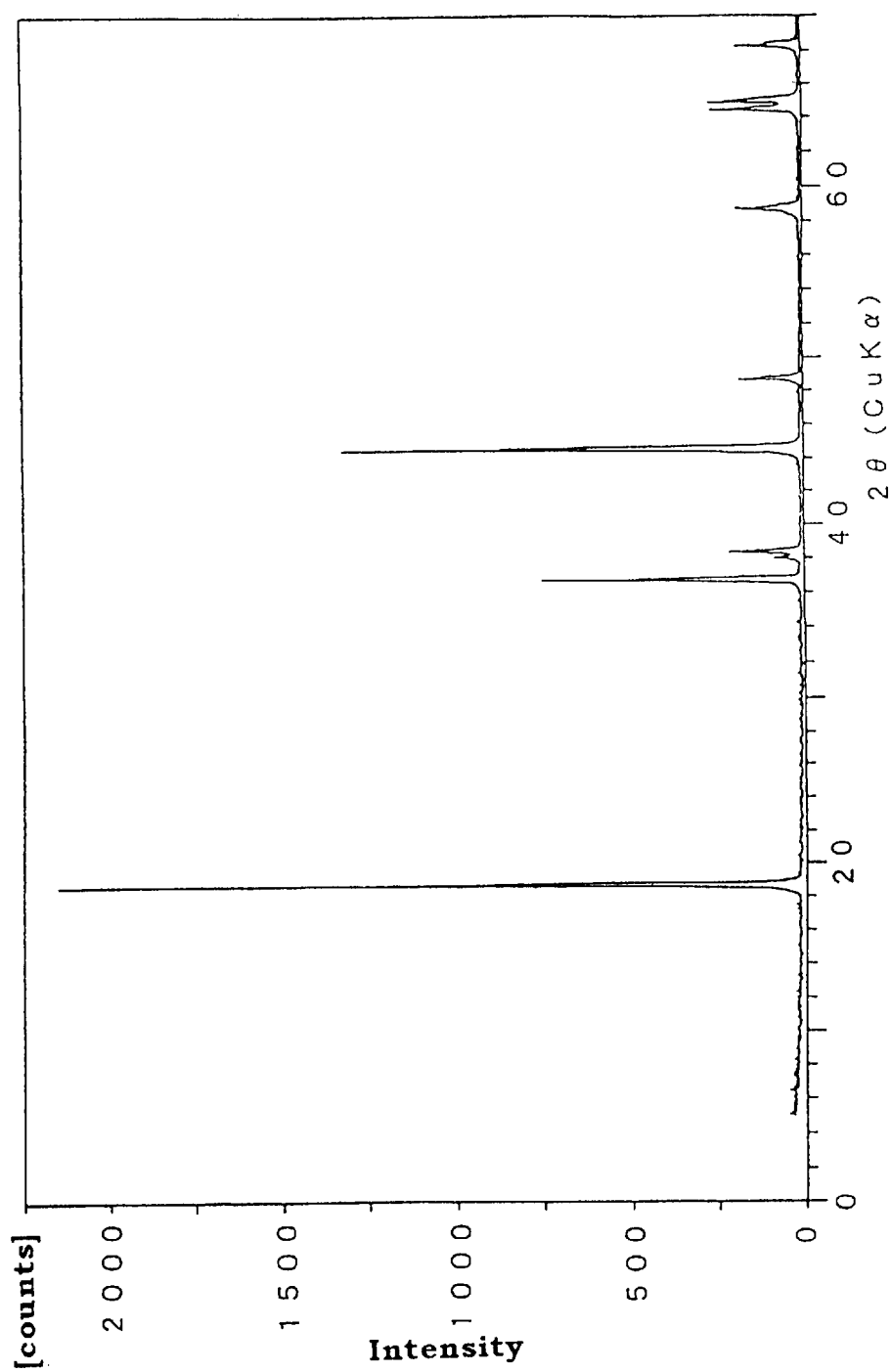
FIG. 13 is powder X-ray diffraction pattern of the complex oxide obtained in Example 11.

Furthermore, the ratio of the trivalence in (Ni+Co) and the physical properties such as BET specific surface area, the peak intensity ratios (003)/(104) and (006)/(101) obtained by powder X-ray diffraction and the bulk density, each measured with respect to these complex oxides are shown in table 4. A SEM photograph (×30,000 magnifications) indicating the primary particles of the complex oxide of Example 5 is shown in FIG. 7, (×30,000 magnifications) indicating the primary particles of the complex oxide of Example 6 is shown in FIG. 8 and (×10,000 magnifications) indicating the primary particles of the complex oxide of Example 7 is shown in FIG. 9. The scale unit of—line shown in the lower part of the respective photographs indicates 1 μm.

The trivalent (Ni+Co) ratio and the BET specific surface area were measured according to Experimental Examples 2 and 3, respectively.

TABLE 4

| No. | Ratio of the Trivalence in (Ni + Co) (%) | BET $m^2/g$ | Ratio of (003)/(104) | Ratio of (006)/(101) | Bulk Density Particle Size (g/ml) |
|---|---|---|---|---|---|
| Example 5 | 100 | 0.43 | 1.486 | 0.115 | 1.75 |
| Example 6 | 99.7 | 0.68 | 1.557 | 0.111 | 2.24 |
| Example 7 | 99.2 | 0.61 | 1.351 | 0.119 | 2.21 |

As is apparent from table 4, the trivalent (Ni+Co) ratio is approximately 100% and the peak intensity ratio of (003)/(104) obtained by the powder X-ray diffraction is lower than 1.2 while that of (006)/(101) is higher than 0.13 and thus the degree of crystallization is exceedingly high.

Furthermore, it can be seen from the SEM photographs that the primary particle grew to a great extent and the bulk density became sufficiently high in case of the complex oxides of Examples 6 and 7, each subjected to press molding.

EXAMPLE 8

There was prepared a mixed aqueous solution of 2.0 mol/l nickel nitrate, cobalt nitrate and aluminum nitrate wherein the molar ratio of Ni:Co:Al was 790:165:25. This mixed aqueous solution and 1.0 mol/l aqueous sodium hydroxide solution were simultaneously added at 25° C. under vigorous stirring so as to keep pH at 10.0 thereby effecting the continuous reaction.

The obtained reaction product was filtered, washed with water (the portion was dried after washing and its composition was $Ni_{0.79}Co_{0.165}Al_{0.025}(OH)_{1.845}(NO_3)_{0.14}\cdot 0.2H_2O$) and suspended in water. Thereafter, boric acid was added to the suspension in an amount such that the molar ration of Ni:Co:Al:B became 790:165:25:20 with respect to the Ni, Co and Al contents in the suspension. To the resultant slurry was added dropwise a 3.0 M aqueous lithium hydroxide solution in an amount such that the atomic ratio of Li/(Ni+Co+Al+B) was 1.05. Thereafter, the reaction mixture was spray-dried. The obtained dry gel was put in an alumina boat and heated at 750° C. for 10 hours in an atmosphere of oxygen in a tube furnace (TF-630 type, a product of Yamada Electric Company), and then pulverized in a mortar to obtain powdery $LiNi_{0.79}Co_{0.165}Al_{0.025}B_{0.020}O_2$.

EXAMPLE 9

There was prepared a mixed aqueous solution of 2.0 mol/l nickel nitrate, cobalt nitrate and aluminum nitrate wherein the molar ratio of Ni:Co:Al was 790:140:50. This mixed aqueous solution and 1.0 mol/l aqueous sodium hydroxide solution were simultaneously added so as to keep pH to 9.75 at 25° C. under vigorous stirring, thereby effecting the continuous reaction.

The obtained reaction product was filtered, washed with water (the portion was dried after washing and its composition was $Ni_{0.79}Co_{0.14}Al_{0.05}(OH)_{1.86}(NO_3)_{0.15}\cdot 0.24H_2O$) and suspended in water. Thereafter, boric acid was added to the suspension in an amount such that the molar ratio of Ni:Co:Al:B became 790:140:50:20 with respect to the Ni, Co and Al contents in the suspension. To the resultant slurry was added dropwise a 3.0 M aqueous lithium hydroxide solution in an amount such that the atomic ratio of Li/(Ni+Co+Al+B) was 1.05. Thereafter, the reaction mixture was spray-dried. The obtained dry gel was put in an alumina boat and heated at 775° C. for 10 hours in an atmosphere of oxygen in a tube furnace (TF-630 type, a product of Yamada Electric Company), and then pulverized in a mortar to obtain powdery $LiNi_{0.79}Co_{0.140}Al_{1.050}B_{0.020}O_2$.

EXAMPLE 10

There was prepared a mixed aqueous solution of 2.0 mol/l nickel nitrate, cobalt nitrate and aluminum nitrate wherein the molar ratio of Ni:Co:Al was 790:90:100. This mixed aqueous solution and 1.0 mol/l aqueous sodium hydroxide solution were simultaneously added so as to keep pH to 9.5 at 25° C. under vigorous stirring thereby effecting the continuous reaction.

The obtained reaction product was filtered, washed with water (the portion was dried after washing and its composition was $Ni_{0.79}Co_{0.09}Al_{0.10}(OH)_{1.92}(NO_3)_{0.14}\cdot 0.18H_2O$) an suspended in water. Thereafter, boric acid was added to the suspension in an amount such that the molar ratio of Ni:Co:Al:B became 790:90:100:20 with respect to the Ni, Co and Al contents in the suspension. To the resultant slurry was added dropwise a 3.0 M aqueous lithium hydroxide solution in an amount such that the atomic ratio of Li/(Ni+Co+Al+B) was 1.05. Thereafter, the reaction mixture was spray-dried. The obtained dry gel was put in an alumina boat and heated at 775° C. for 10 hours in an atmosphere of oxygen in a tube furnace (TF-630 type, a product of Yamada Electric Company), and then pulverized in a mortar to obtain powdery $LiNi_{0.79}Co_{0.090}Al_{0.100}B_{0.020}O_2$.

EXAMPLE 11

There was prepared a mixed aqueous solution of 2.0 mol/l nickel nitrate, cobalt nitrate, aluminum nitrate and ferric nitrate wherein the molar ratio of Ni:Co:Al:Fe was 800:100:50:50. This mixed aqueous solution and 1.0 mol/l aqueous sodium hydroxide solution were simultaneously added so as to keep pH to 9.5 at 25° C. under vigorous stirring thereby effecting the continuous reaction.

The obtained reaction product was filtered, washed with water (the portion was dried after washing and its composition was $Ni_{0.8}Co_{0.01}Al_{0.05}Fe_{0.05}(OH)_{1.96}(NO_3)_{0.14}\cdot 0.18H_2O$) and suspended in water to form a slurry. To the resultant slurry was added dropwise a 3.0 M aqueous lithium hydroxide solution in an amount such that the atomic ratio of Li/(Ni+Co+Al+Fe) was 1.05. Thereafter, the reaction mixture was spray-dried. The obtained dry gel was put in an alumina boat and heated at 725° C. for 15 hours in an atmosphere of oxygen in a tube furnace (TF-630 type, a product of Yamada Electric Company), and then pulverized in a mortar to obtain powdery $LiNi_{0.80}Co_{0.100}Al_{0.050}Fe_{0.050}O_2$.

EXAMPLE 12

There was prepared a mixed aqueous solution of 2.0 mol/l nickel nitrate, cobalt nitrate, manganese nitrate wherein the molar ratio of Ni:Co:Mn was 800:100:50:50. This mixed aqueous solution and 1.0 mol/l aqueous sodium hydroxide solution were simultaneously added so as to keep pH to 9.5 at 25° C. under vigorous stirring thereby effecting the continuous reaction.

The obtained reaction product was filtered, washed with water and suspended in water to form a slurry. To the resultant slurry was added dropwise a 3.0 M aqueous lithium hydraxide solution in an amount such that the atomic ratio of Li/(Ni+Co+Mn) was 1.05. Thereafter, the reaction mixture was spray-dried. The obtained dry gel was put in an alumina boat and heated at 750° C. for 10 hours in an atmosphere of oxygen in a tube furnace (TF-630 type, a product of Yamada Electric Company), and then pulverized in a mortar to obtain powdery $LiNi_{0.800}Co_{0.150}Mn_{0.050}O_2$.

Comparative Example 4 (Dry Process Corresponding to Example 5)

1.00 Mol lithium hydroxide, 0.08 mol nickle hydroxide, 0.10 mol cobalt hydroxide and 0.01 mol aluminum hydroxide were sufficiently mixed in dry state and pulverized in a mortar, and then pelletized into size of 14 mm of a diameter×2 mm of a thickness. The resultant pellets were heated at 750° C. for 48 hours in an atmosphere of oxygen.

The chemical composition of the heating product was $LiNi_{0.80}CO_{0.10}Al_{0.10}O_2$.

Comparative Example 5 (Dry Process Corresponding to Example 8)

1.00 Mol lithium hydroxide, 0.79 mol nickel hydroxide, 0.165 mol cobalt hydroxide, 0.025 mol aluminum hydroxide and 0.02 mol boric acid were sufficiently mixed in dry state and pulverized in a mortar, and then pelletized into size of 14 mm of a diameter×2 mm of a thickness. The resultant pellets were heated at 750° C. for 48 hours in an atmosphere of oxygen.

The chemical composition of the heating product was $LiNi_{0.79}Co_{0.165}Al_{0.025}B_{0.02}O_2$.

The powder X-ray diffraction patterns of the complex oxides obtained in Examples 8~11 are shown in FIGS. 10~13, respectively. As is apparent from them, any peak based on by-product was not recognized in each process and the complexoxides are estimated to have uniformly doped layered structure.

Figure 14:
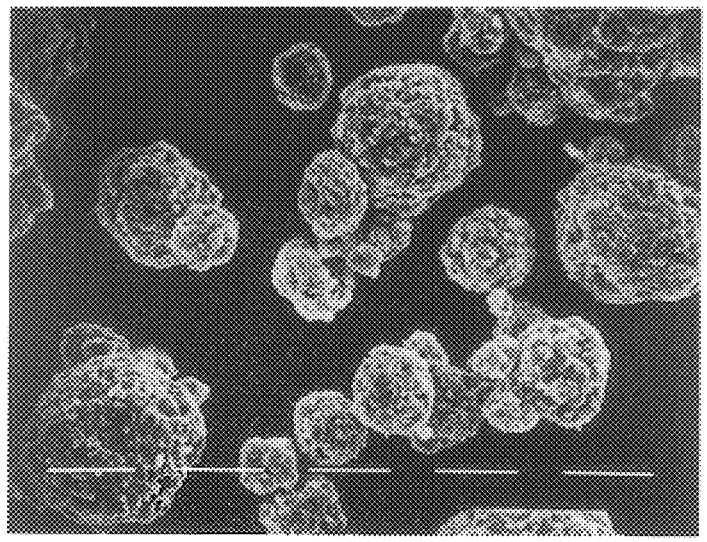
FIG. 14 is SEM photograph (×1,500 magnifications) indicating the primary particles of the complex oxide obtained in Example 8.
Figure 15:
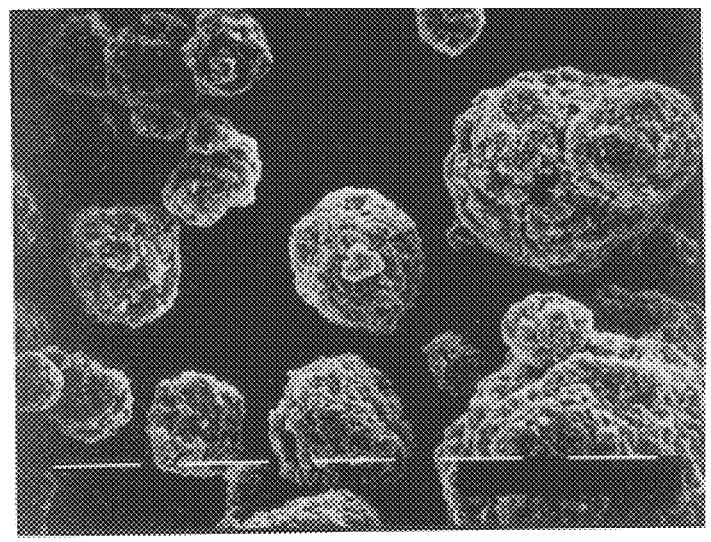
FIG. 15 is SEM photograph (×1,500 magnifications) indicating the primary particles of the complex oxide obtained in Example 10.
Figure 16:
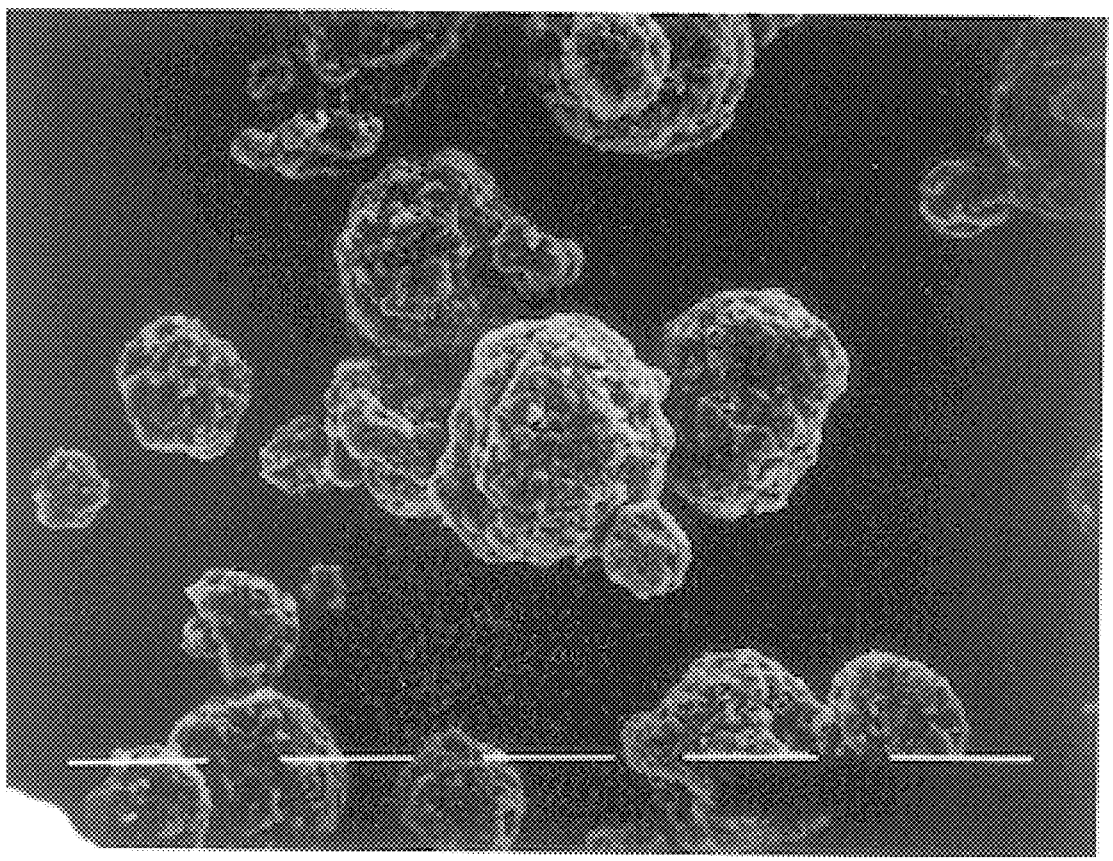
FIG. 16 is SEM photograph (×1,500 magnifications) indicating the primary particles of the complex oxide obtained in Example 11.

Furthermore, the trivalent (Ni+Co) ratio and the physical properties such as BET specific surface area, the peak intensity ratios (003)/(104) and (006)/(101) obtained by powder X-ray diffraction, each measured with respect to these complex oxides are shown in table 5. A SEM photograph (×1,500 magnifications) indicating the primary particles of the complex oxide of Example 8 is shown in FIG. 14, that (×1,500 magnifications) indicating the primary particles of the complex oxide of Example 10 is shown in FIG. 15 and that (×1,500 magnifications) indicating the primary particles of the complex oxide of Example 11 is shown in FIG. 16. The scale unit of—line shown in the lower part of the respective photographs indicates 10 μm.

The trivalent (Ni+Co) ratio and the BET specific surface area were measured according to Experimental Examples 2 and 3, respectively.

TABLE 5

| No. | Ratio of the Trivalence in (Ni + Co) (%) | BET m²/g | Ratio of (003)/(104) | Ratio of (006)/(101) |
| --- | --- | --- | --- | --- |
| Example 8 | 100.0 | 0.44 | 1.330 | 0.105 |
| Example 9 | 100.0 | 0.62 | 1.236 | 0.102 |
| Example 10 | 99.8 | 0.57 | 1.311 | 0.114 |
| Example 14 | 99.9 | 0.69 | 1.334 | 0.099 |

As is apparent from table 5, each of the complex oxides of the above Examples has the physical property satisfying sufficiently the range defined in the appended claims.

Moreover, table 6 shows the results of the battery test (charge and discharge test) conducted according to Experimental Example 4 using the respective complex oxides of Examples 5~11 and Comparative Examples 4~5 to evaluate initial discharge capacity (mAh/g), discharge capacity at 100th cycle (mAh/g) and decrease rate of discharge capacity at 100th cycle (%).

TABLE 6

| No. | Initial Discharge Capacity (mAh/g) | Discharge Capacity at 100th Cycle (mAh/g) | Decrease Rate of Discharge Capacity at 100th Cycle (%) |
| --- | --- | --- | --- |
| Example 5 | 173 | 161 | 7.2 |
| Example 6 | 176 | 165 | 6.4 |
| Example 7 | 176 | 165 | 6.0 |
| Example 8 | 185 | 177 | 4.3 |
| Example 9 | 186 | 180 | 3.2 |
| Example 10 | 176 | 149 | 4.2 |
| Example 11 | 159 | 147 | 7.6 |
| Comparative Example 4 | 143 | 111 | 24.7 |
| Comparative Example 5 | 139 | 98 | 29.6 |

It is recognized from table 6 that the lithium nickel cobalt complex oxides have a tendency to decrease the initial discharge capacity with the increase in the Al content therein and correspondingly with decrease in the Co content as compared with the complex oxide of the Comparative Example 3 shown in table 3, and that the improvement in the cycle characteristics may be achieved by the addition of boron. Furthermore, it is understood that the addition of Fe shows a great tendency to decrease the initial discharge capacity as compared with the case of Al addition. However, the complex oxide of the present invention is superior in the initial capacity and the cycle characteristics to those of Comparative Examples 4 and 5.

It can be seen from the above results that although the addition of Al significantly decreases the amount of the expensive Co used, it causes a negative effect on battery performance. However, the positive electrode employed hitherto as the material for a lithium ionic secondary battery has a problem with thermal stability. On the other hand, the complex oxides obtained by the present invention show good improvement with respect to the thermal stability.

As an index for the thermal stability of the positive electrode material, there is a means of measurement wherein differential thermal analysis is conducted with respect to the positive electrode material placed in charged state and the exothermic temperature at which oxygen evolution occurs. The test results of the thermal stability test carried out according to Experimental Example 5 with respect to the complex oxides obtained by the present invention are shown in table 7.

TABLE 7

| No. | Exothermic Peak Temperature at which Oxygen Evolution Occurs (° C.) |
| --- | --- |
| Example 1 | 215 |
| Example 2 | 212 |
| Example 3 | 218 |
| Example 4 | 220 |
| Example 5 | 236 |
| Example 6 | 253 |
| Example 7 | 253 |
| Example 8 | 252 |
| Example 9 | 249 |

TABLE 7-continued

| No. | Exothermic Peak Temperature at which Oxygen Evolution Occurs (° C.) |
|---|---|
| Example 10 | 236 |
| Comparative Example 2 | 198 |

It can be seen from table 7 that the introduction of Al into the lithium nickel cobalt complex oxide causes the elevation in the exothermic temperature at which oxygen evolution occurs in comparison with the complex oxide of Comparative Example 2, and further, large primary particle as in Examples 6 and 7 causes the elevation in the exothermic temperature similarly so that the thermal stability can be improved.

As stated above, the lithium nickel cobalt complex oxide obtained by the present invention, especially one doped completely with Al and/or B as the solid liquid is satisfactory secondary battery positive electrode material as the battery performance.

Experimental Example 1
Scherrer's Method:

It is a method wherein the size of crystallite is calculated by the following equation (1) on the assumption that the width of diffraction pattern is dependent on the size of crystallite alone owing to uniformity in the size of crystallite and no strain in the crystals.

$$D_{hkl}=(k\lambda)/(\beta \cos \theta) \quad \text{(Equation 1)}$$

wherein $D_{hkl}$ (angstrom) represents size of crystallite in vertical direction to the face (hkl), $\lambda$ (angstrom) the wave length of X-ray, $\beta$ (rad) the width of diffraction pattern, $\theta$ (°) angle of diffraction, and k a constant.

Experimental Example 2
A Method for Measuring Trivalent (Ni+Co):

The trivalent (Ni+Co) ratio is value expressed in percentage the ratio of the trivalent (Ni+Co) to the total (Ni+Co), and is measured by oxidation-reduction titration. 0.2 Gram of a sample was dissolved in 0.25M $FeSO_4$—3.6N $H_2SO_4$ solution, and 2 ml of a concentrated phosphoric acid was added to the solution. The mixture was titrated with a 0.1N $KMnO_4$ solution. Blank test was carried out in the same manner as in the above. The trivalent (Ni+Co) % was calculated by the following equation. In the equation, f represents the factor of the 0.1 N $KMnO_4$ solution. $X_0$ the titer of the blank test (ml), X the titer of the sample (ml), m the amount of the sample (g), A the content of Ni (%) and B the content of Co (%). The trivalent (Ni+Co) ratio (%) in the sample=10f $(X_0-X)/m$ (A/5.871+B/5.893).

Experimental Example 3
A method for Measuring BET Specific Surface Area:

The sample was degassed by heating under the flow of a mixed gas 30% nitrogen and 70% helium, and thereafter specific surface area was measured according to the BET one point continuous flowing method using "MONOSORB" (a product of Yuasa Ionics Co., Ltd.).

Experimental Example 4
A Battery Test Method

The lithium nickel complex oxide, acetylene black as a conductive agent and tetrafluoroethylene as a binder were mixed in a ratio of 88:6.0:6.0% by weight. Thereafter, the mixture was subjected to compression molding on stainless mesh, thereby obtaining pellets each having a diameter of 18 mm. The resultant pellets were dried at 200° C. for 2 hours and used as a positive electrode material.

As a negative electrode material was used a rolled lithium sheet metal pressed-bonded to a stainless substrate. As a diaphragm, porous membrane made of polypropylene ("Cell Guard 2502") and a glass filter-paper filter were used. There was used an electrolyte in which 1 M $LiClO_4$ was dissolved in an ethylene carbonate/dimethylmethoxyethane mixture (1:1 weight ratio). The procedures up to completion from setup of a test cell (semi-open type cell) were conducted in an argon replaced dry box. The charging and discharging for this lithium battery were performed under a voltage control between 3.0 V and 4.3 V. at a constant current density of 0.4 $mA/cm^2$.

Experimental Example 5
A Thermal Stability Test Method:

A cell was prepared by a similar manner as in Experimental Example 3 and charging was conducted under the constant current density of 0.4 $mA/cm^2$ until it reached 4.4 V. After the completion of charging, the cell was decomposed to take out the positive electrode. The positive electrode was washed with the electrolyte solution and dried under vacuum. The dried positive electrode was subjected to a differential thermal analysis apparatus under flow of nitrogen at a heating rate of 2° C./min. to examine the exothermic peak temperature at which oxygen evolution occurs.

Industrial Applicability

As explained above, according to the present invention there can be prepared a complex oxide represented by the general formula (I)

and by using this complex oxide there can be provided a positive electrode active material for a secondary battery which is excellent in the charging and discharging cycle characteristics so that it retains high battery capacity that is comparable to the hitherto known $LiNiO_2$ even by increasing the number of cycles and which has an improved cycle property (stability) at high temperature.

Also, since the amount used of the expensive Co can be suppressed to the minimum by introducing further the metal represented by M, it is advantageous from the viewpoint of cost.

What is claimed is:

1. In a process for preparing a complex oxide represented by the general formula (I)

(wherein M represents at least one element selected from the group consisting of Al, Fe and Mn, x represents $0<x\leq0.5$, $x_1$ represents $0<x_1<0.5$, $x_1+x_2=x$, $x_2$ represents $0<x_2<0.5$ and y represents $0.9\leq y\leq1.3$), the process characterized by adding to a basic metal salt having the general formula (II)

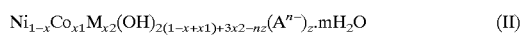

[wherein M represents at least one element selected from the group consisting of Al, Fe and Mn, x represents $0<x\leq0.5$, $x_1$ represents $0<x_1<0.5$, $x_2$ represent $0<x_2<0.3$, $x_1+x_2=x$, $A^{n-}$ represents an anion having a valence of n (n=1~3), z and m are positive numbers satisfying respectively the ranges of $0.03 \leq z \leq 0.3$, $0 \leq m < 2$] an amount of a lithium compound corresponding to the number of atomic moles of Li indicated by y in an aqueous medium to form a slurry, spray or freeze drying the formed slurry, subjecting the resultant dried material to press molding, and heating the press molded product at a temperature about 600° C.~900° C. for about 4 hours or more in an oxidative atmosphere.

2. In a process for preparing a complex oxide represented by the general formula (I)

$$Li_y Ni_{1-x} Co_{x1} M_{x2} O_2 \qquad (I)$$

(wherein M represents at least one element selected from the group consisting of Al, Fe and Mn, x represents $0 < x \leq 0.5$, $x_1$ represents $0 < x_1 < 0.5$, $x_1 + x_2 = x$, $x_2$ represents $0 < x_2 < 0.5$ and y represents $0.9 \leq y \leq 1.3$), the process characterized by:

adding to a basic metal salt having the general formula (II)

$$Ni_{1-x} Co_{x1} M_{x2}(OH)_{2(1-x+x1)+3x2-nz}(A^{n-})_z \cdot mH_2O \qquad (II)$$

[wherein M represents at least one element selected from the group consisting of Al, Fe and Mn, x represents $0 < x \leq 0.5$, $x_1$ represents $0 < x_1 < 0.5$, $x_2$ represents $0 < x_2 < 0.3$, $x_1 + x_2 = x$, $A^{n-}$ represents an anion having a valence of n (n=1~3), z and m are positive numbers satisfying respectively the ranges of $0.03 \leq z \leq 0.3$, $0 \leq m < 2$] an amount of a lithium compound corresponding to the number of atomic moles of Li indicated by y in an aqueous medium to form a slurry, spray or freeze drying the formed slurry, pre-heating the resultant dried material at a temperature of about 600° C.~900° C. for about 0.5 hour or more, subjecting the resultant pre-heating product to press molding, and heating the press molded product at a temperature of about 600° C.~900° C. for about 1 hour or more in an oxidative atmosphere.

* * * * *